(12) United States Patent
Takaoka et al.

(10) Patent No.: US 9,396,198 B2
(45) Date of Patent: Jul. 19, 2016

(54) COMPUTER SYSTEM, FILE MANAGEMENT METHOD AND METADATA SERVER

(75) Inventors: Nobumitsu Takaoka, Tokyo (JP); Shoji Kodama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 324 days.

(21) Appl. No.: 14/003,972

(22) PCT Filed: Sep. 21, 2011

(86) PCT No.: PCT/JP2011/071437
§ 371 (c)(1),
(2), (4) Date: Oct. 16, 2013

(87) PCT Pub. No.: WO2013/042218
PCT Pub. Date: Mar. 28, 2013

(65) Prior Publication Data
US 2014/0040331 A1 Feb. 6, 2014

(51) Int. Cl.
*G06F 17/30* (2006.01)
*G06F 3/06* (2006.01)

(52) U.S. Cl.
CPC ........ *G06F 17/30067* (2013.01); *G06F 3/0605* (2013.01); *G06F 3/067* (2013.01); *G06F 3/0631* (2013.01); *G06F 3/0647* (2013.01); *G06F 17/30117* (2013.01); *G06F 17/30194* (2013.01)

(58) Field of Classification Search
CPC . G06F 17/30067; G06F 3/0605; G06F 3/067; G06F 30/0631; G06F 3/0647
USPC .................................. 707/827, 821
See application file for complete search history.

(56) References Cited

U.S. PATENT DOCUMENTS 7,827,201 B1 * 11/2010 Gordon ............. G06F 17/30607
707/792
2002/0120763 A1 * 8/2002 Miloushev ........ G06F 17/30197
709/230
2004/0153481 A1 * 8/2004 Talluri .................. G06F 3/0607

(Continued)

FOREIGN PATENT DOCUMENTS

JP 2008-017049 A 1/2008
JP 2010-061268 A 3/2010

(Continued)

OTHER PUBLICATIONS

Fetterly, Dennis, et al.; TidyFS: A Simple and Small Distributed File System; Oct. 10, 2010; pp. 1-7; Microsoft Research Technical Report MSR-TR-2010-124.

(Continued)

*Primary Examiner* — Pierre Vital
*Assistant Examiner* — Andrew N Ho
(74) *Attorney, Agent, or Firm* — Foley & Lardner LLP

(57) ABSTRACT

A computer system, comprising: a file server; a metadata server; and a business server, the metadata server being coupled to a storage apparatus for providing a save area for storing at least one file that is removed from the file server, the metadata server storing a metadata repository for managing metadata of a file and the files stored in the save area, the metadata server being configured to: store a file as a saved file in the save area, in a case of detecting that the file stored in the file server is to be removed; and store information indicating a location of the file in the file server and information indicating the location of the saved file in the save area in association with each other in the metadata repository.

17 Claims, 32 Drawing Sheets

(56) References Cited

U.S. PATENT DOCUMENTS

| | | | |
|---|---|---|---|
| 2005/0267929 A1* | 12/2005 | Kitamura | G06F 3/061 709/201 |
| 2006/0161518 A1* | 7/2006 | Lacapra | H04L 61/1576 |
| 2006/0190454 A1* | 8/2006 | Kato | A63F 13/12 |
| 2006/0271604 A1* | 11/2006 | Shoens | G06F 17/30088 |
| 2007/0136391 A1* | 6/2007 | Anzai | G06F 17/30197 |
| 2007/0156659 A1* | 7/2007 | Lim | G06F 21/6227 |
| 2007/0185917 A1* | 8/2007 | Prahlad | G05F 17/30997 |
| 2008/0183802 A1 | 7/2008 | Gray et al. | |
| 2009/0177718 A1* | 7/2009 | Patterson | G06F 11/1458 |
| 2009/0216774 A1* | 8/2009 | Rao | G06F 17/30153 |
| 2010/0036851 A1* | 2/2010 | Paterson-Jones | G06F 17/30067 707/636 |
| 2010/0088282 A1* | 4/2010 | Yamada | G06F 3/0608 707/649 |
| 2010/0088349 A1* | 4/2010 | Parab | G06F 17/30156 707/802 |
| 2010/0106933 A1* | 4/2010 | Kamila | G06F 3/0605 711/171 |
| 2010/0115008 A1* | 5/2010 | Nakatani | G06F 17/302 707/823 |
| 2010/0299306 A1 | 11/2010 | Agetsuma et al. | |
| 2011/0047195 A1* | 2/2011 | Le | G06F 17/30233 707/827 |
| 2014/0108474 A1* | 4/2014 | David | G06F 17/30 707/827 |

FOREIGN PATENT DOCUMENTS

| | | |
|---|---|---|
| JP | 2010-271963 A | 12/2010 |
| JP | 2011-090531 A | 5/2011 |

OTHER PUBLICATIONS

Oriani, Andre, et al.; The Search for a Highly-Available Hadoop Distributed Filesystem; Aug. 2010; pp. 1-27; Technical Report IC-10-24.

Akturk, Ismail; Asynchronous Replication of Metadata Across Multi-master Servers in Distributed Data Storage Systems; Dec. 2009; pp. i-ix, 1-61; , Retrieved from the Internet: <URL: http://etd.1su.edu/docs/available/etd-11042009-151525/>.

European Patent Office extended search report on application 11872681.9 dated Apr. 7, 2015; 15 pages.

PCT International Search Report on application PCT/JP2011/071437 mailed Oct. 18, 2011; 1 page.

* cited by examiner

STORAGE MANAGEMENT TABLE

| STORAGE ID | STORAGE NAME | TYPE | IP ADDRESS |
|---|---|---|---|
| s1000 | FS1 | FILE SERVER | 192.168.10.100 |
| s2000 | FS2 | FILE SERVER | 192.168.10.101 |
| s3000 | S1 | ARCHIVE STORAGE | 192.168.20.100 |
| ⋮ | ⋮ | ⋮ | ⋮ |

*Fig. 4*

NAME SPACE MANAGEMENT TABLE

| NAME SPACE ID (1521) | NAME SPACE NAME (1522) | STORAGE ID (1523) | CAPACITY (1524) | PROTOCOL (1525) | USED VOLUME (1526) | USAGE (1527) |
|---|---|---|---|---|---|---|
| n1001 | share1 | s1000 | 20TB | nfs | 5TB | PRIMARY |
| n1002 | share2 | s1000 | 20TB | CIFS | 5TB | PRIMARY |
| n2001 | share3 | s2000 | 20TB | nfs | 5TB | PRIMARY |
| n3001 | r | s3000 | 50TB | HTTPS | 10TB | SAVE |

METADATA MANAGEMENT TABLE

| METADATA ID /1531 | PATH /1532 | NAME SPACE ID /1533 | ORIGINAL METADATA /1534 | FILE STATUS /1535 |
|---|---|---|---|---|
| 100 | /share1/a.doc | n1001 | | PRESENT |
| 110 | /share1/b.doc | n1001 | | REMOVED |
| 120 | /share1/c.doc | n1001 | | PRESENT |

SAVED FILE MANAGEMENT TABLE

| METADATA ID /1541 | SAVED PATH /1542 | SAVED NAME SPACE ID /1543 |
|---|---|---|
| 100 | /r/FS1/share1/b.doc | n3001 |
| ⋮ | ⋮ | ⋮ |

METADATA MANAGEMENT TABLE

| METADATA ID (1531) | PATH (1532) | NAME SPACE ID (1533) | ORIGINAL METADATA (1534) | FILE STATUS (1535) |
|---|---|---|---|---|
| 100 | /share1/a.doc | n1001 | | REMOVED |
| 110 | /share1/b.doc | n1001 | | REMOVED |
| 120 | /share1/c.doc | n1001 | | PRESENT |

*Fig. 12*

SAVED FILE MANAGEMENT TABLE

| METADATA ID (1541) | SAVED PATH (1542) | SAVED NAME SPACE ID (1543) |
|---|---|---|
| 110 | /r/FS1/share1/b.doc | n3001 |
| 100 | /r/FS1/share1/a.doc | n3001 |
| ⋮ | ⋮ | ⋮ |

*Fig. 13*

LIST

| METADATA ID ~1161 | PATH ~1162 | ORIGINAL METADATA ~1163 | STORAGE ID ~1164 | IP ADDRESS ~1165 | NAME SPACE ID ~1166 | FILE STATUS ~1167 | SAVE DESTINATION INFORMATION ~1168 |
|---|---|---|---|---|---|---|---|
| 100 | /share1/a.doc | | s1000 | 192.168.10.100 | n1001 | REMOVED | |
| 110 | /share1/b.doc | | s1000 | 192.168.10.100 | n1001 | REMOVED | |
| 120 | /share1/c.doc | | s1000 | 192.168.10.100 | n1001 | PRESENT | |

Fig. 15A

SAVE DESTINATION INFORMATION 1168

| SAVED PATH 11681 | STORAGE ID 11682 | IP ADDRESS 11683 | SAVED NAME SPACE ID 11684 |
|---|---|---|---|
| /r/FS1/share1/a.doc | s3000 | 192.168.20.100 | n3001 |
| /r/FS1/share1/b.doc | s3000 | 192.168.20.100 | n3001 |
| | | | |

*Fig. 15B*

HIDDEN FILE MANAGEMENT TABLE

| PATH | NAME SPACE ID | ORIGINAL METADATA | HIDDEN FILE PATH |
|---|---|---|---|
| /share1/a.doc | n1001 | | /share1/temp/a.doc |
| /share1/b.doc | n1001 | | /share1/temp/b.doc |

*Fig. 17*

SAVED FILE MANAGEMENT TABLE 154

| METADATA ID 1541 | SAVED PATH 1542 | SAVED NAME SPACE ID 1543 | ADDRESS RANGE 1544 |
|---|---|---|---|
| 110 | /r/FS1/share1/b.doc | n3001 | [10,20) |
|  |  |  |  |
|  |  |  |  |

Fig. 19

HIDDEN FILE MANAGEMENT TABLE

| PATH | NAME SPACE ID | ORIGINAL METADATA | HIDDEN FILE PATH | ADDRESS RANGE | ERASURE TYPE |
|---|---|---|---|---|---|
| /share1/a.doc | n1001 | n3001 | /share1/tem/a.doc | [10,20) | REMOVED |

Fig. 20

METADATA MANAGEMENT TABLE

| METADATA ID (1531) | PATH (1532) | NAME SPACE ID (1533) | ORIGINAL METADATA (1534) | FILE STATUS (1535) |
|---|---|---|---|---|
| 100 | /share1/a.doc | n1001 | MODIFIED TIME=10:00 | PRESENT |
|  |  |  |  |  |

*Fig. 23*

METADATA MANAGEMENT TABLE

| METADATA ID (1531) | PATH (1532) | NAME SPACE ID (1533) | ORIGINAL METADATA (1534) | FILE STATUS (1535) |
|---|---|---|---|---|
| 100 | /share1/a.doc | n1001 | MODIFIED TIME=12:00 | PRESENT |
| 101 | /share1/a.doc | n1001 | MODIFIED TIME=10:00 | PARTIALLY ERASED |
|  |  |  |  |  |

*Fig. 24*

SAVED FILE MANAGEMENT TABLE

| METADATA ID | SAVED PATH | SAVED NAME SPACE ID | ADDRESS RANGE |
|---|---|---|---|
| 110 | /r/FS1/share1/b.doc | n3001 | [10,20] |
| 101 | /r/s1000/share/a.doc_diff | n3001 | [0,30] |

Fig. 25

STORAGE MANAGEMENT TABLE

NAME SPACE MANAGEMENT TABLE

| NAME SPACE ID 1521 | NAME SPACE NAME 1522 | STORAGE ID 1523 | CAPACITY 1524 | PROTOCOL 1525 | USED VOLUME 1526 | USAGE 1527 |
|---|---|---|---|---|---|---|
| n1001 | share1 | s1000 | 20TB | nfs | 5TB | PRIMARY |
| n1002 | share2 | s1000 | 20TB | CIFS | 5TB | PRIMARY |
| n2001 | share3 | s2000 | 20TB | nfs | 5TB | PRIMARY |
| n3001 | r | s3000 | 50TB | HTTPS | 10TB | SAVE |
| n4001 | BU | s4000 | 50TB | HTTPS | 20TB | BACKUP |

METADATA MANAGEMENT TABLE 153

| METADATA ID 1531 | PATH 1532 | NAME SPACE ID 1533 | ORIGINAL METADATA 1534 | FILE STATUS 1535 | HASH VALUE 1536 |
|---|---|---|---|---|---|
| 100 | /share1/a.doc | n1001 | | PRESENT | e001 |
| 110 | /share1/a.doc | n1001 | | REMOVED | fee0 |
| 120 | /share1/a.doc | n1001 | | PRESENT | dee0 |
| 400 | /BU/x.doc | n4001 | | BU | e001 |

Fig. 30

COMPUTER SYSTEM, FILE MANAGEMENT METHOD AND METADATA SERVER

BACKGROUND OF THE INVENTION

This invention relates to a file management method for use in a computer system including a storage apparatus, a metadata server for managing metadata of files stored in the storage apparatus, a business server for executing predetermined business processing, and an analysis server for executing analytical processing on data used by the business server.

In a computer system in which a plurality of computers and a plurality of file servers corresponding to storage apparatus are coupled via a network, business programs operating on the computers execute business logic. The business programs include, for example, programs that autonomously operate, such as a document management system, and interactive programs such as a word processing program used by a user.

Business data required by the business program to execute the logic may be stored in the file server to flexibly perform a configuration change of a system and management of a storage capacity.

Moreover, it is a common practice that an analysis program operating on a computer different from the business program executes the analytical processing such as statistical processing on the business data stored in the file server to obtain information useful for business management.

The business program may remove a file stored in the file server in the course of the logic. On the other hand, it is preferred that the analysis program obtain and analyze all files in the computer system tracing back in time, including the file removed from the file server, in order to obtain more useful information.

As a method for allowing the removed file to be read later, there is known a method using a backup system. The backup system periodically reads data stored in the file server and copies the data in another storage apparatus for backup. However, the backup system holds the same data in the file server and the storage apparatus for backup, and hence a use efficiency of storage spaces is low.

Moreover, as another method, there is known a method using a snapshot function of the file server. The snapshot function is used so that a plurality of states of the file server at a time point in the past may be held while suppressing an amount of consumption of the storage spaces. However, there is a limit in the number of snapshots that can be created, and hence, for example, the method is not suited for an application where a file that was present at a time point tracing back in time 5 years or more is to be obtained.

Moreover, as a method of moving a file to another storage apparatus, there is known an archive system. The archive system is a system for moving a file that satisfies a predetermined condition (for example, file that has not been modified for a certain period of time) to another storage. However, the archive system deals only with files that are present in the file system, and cannot specify "removed files" as a condition, for example.

Moreover, in Japanese Patent Application Laid-open No. 2008-17049, there is disclosed a technology in which a file removed by a user's operation is not actually removed but is saved in another storage space so that the file can be restored later.

SUMMARY OF THE INVENTION

However, in the technology disclosed in Japanese Patent Application Laid-open No. 2008-17049, when the removed file is restored once, the file is not managed by the system anymore. Therefore, the object of providing to the analysis program all files in the computer system tracing back in time, including the removed file, cannot be achieved.

This invention realizes a computer system allowing all files under management of a business program, including a removed file that was present in the past, to be referenced from an analysis program without creating an extra copy.

The present invention can be appreciated by the description which follows in conjunction with the following figures, wherein: a computer system comprises: a file server for managing a plurality of files; a metadata server for managing a plurality of piece of metadata of the plurality of files; and a business server for using the plurality of files to execute predetermined business processing. The file server, the metadata server, and the business server is coupled to each other via a network. The file server includes a first processor, a first memory coupled to the first processor, a first network interface coupled to the first processor, and a first storage medium coupled to the first processor, for storing the plurality of files. The metadata server includes a second processor, a second memory coupled to the second processor, a second network interface coupled to the second processor, and a second storage medium coupled to the second processor. The business server includes a third processor, a third memory coupled to the third processor, and a third network interface coupled to the third processor. The metadata server is coupled to a storage apparatus including a controller and a plurality of storage media, for providing a save area for storing at least one file that is removed from the file server. The second storage medium stores a metadata repository for managing at least one of the plurality of piece of metadata of the plurality of files and at least one location of one of the plurality of files stored in the save area. The metadata server is configured to: store the one of the plurality of files as a saved file in the save area, in a case of detecting that the one of the plurality of files stored in the file server is to be removed by the predetermined business processing executed by the business server; and store information indicating a location of the one of the plurality of files in the file server and information indicating the location of the saved file in the save area in association with each other in the metadata repository.

According to this invention, the metadata server may manage the file removed from the file server without creating the extra copy.

BRIEF DESCRIPTION OF THE DRAWINGS

FIG. 4 is an explanatory diagram illustrating an example of a configuration of a storage management table according to the first embodiment of this invention, FIG. 5 is an explanatory diagram illustrating an example of a configuration of a name space management table according to the first embodiment of this invention, FIG. 6 is an explanatory diagram illustrating an example of a configuration of a metadata management table according to the first embodiment of this invention, FIG. 7 is an explanatory diagram illustrating an example of a configuration of a saved file management table according to the first embodiment of this invention, FIG. 12 is an explanatory diagram illustrating the metadata management table after a file is moved according to the first embodiment of this invention, FIG. 13 is an explanatory diagram illustrating the saved file management table after the file is moved according to the first embodiment of this invention, FIGS. 15A and 15B are explanatory diagrams illustrating an example of a configuration of the list according to the first embodiment of this invention, FIG. 17 is an explanatory diagram illustrating an example of a configuration of a hidden file management table according to a second embodiment of this invention, FIG. 19 is an explanatory diagram illustrating an example of a configuration of the saved file management table according to a third embodiment of this invention, FIG. 20 is an explanatory diagram illustrating an example of a configuration of the hidden file management table according to the third embodiment of this invention, FIGS. 23 and 24 are explanatory diagrams each illustrating an example of the metadata management table according to the third embodiment of this invention, FIG. 25 is an explanatory diagram illustrating an example of the saved file management table according to the third embodiment of this invention, FIG. 29 is an explanatory diagram illustrating an example of a configuration of the name space management table according to the fourth embodiment of this invention, FIG. 30 is an explanatory diagram illustrating an example of a configuration of the metadata management table according to the fourth embodiment of this invention.

DETAILED DESCRIPTION OF THE PREFERRED EMBODIMENTS

First, this invention is outlined.

Figure 1:
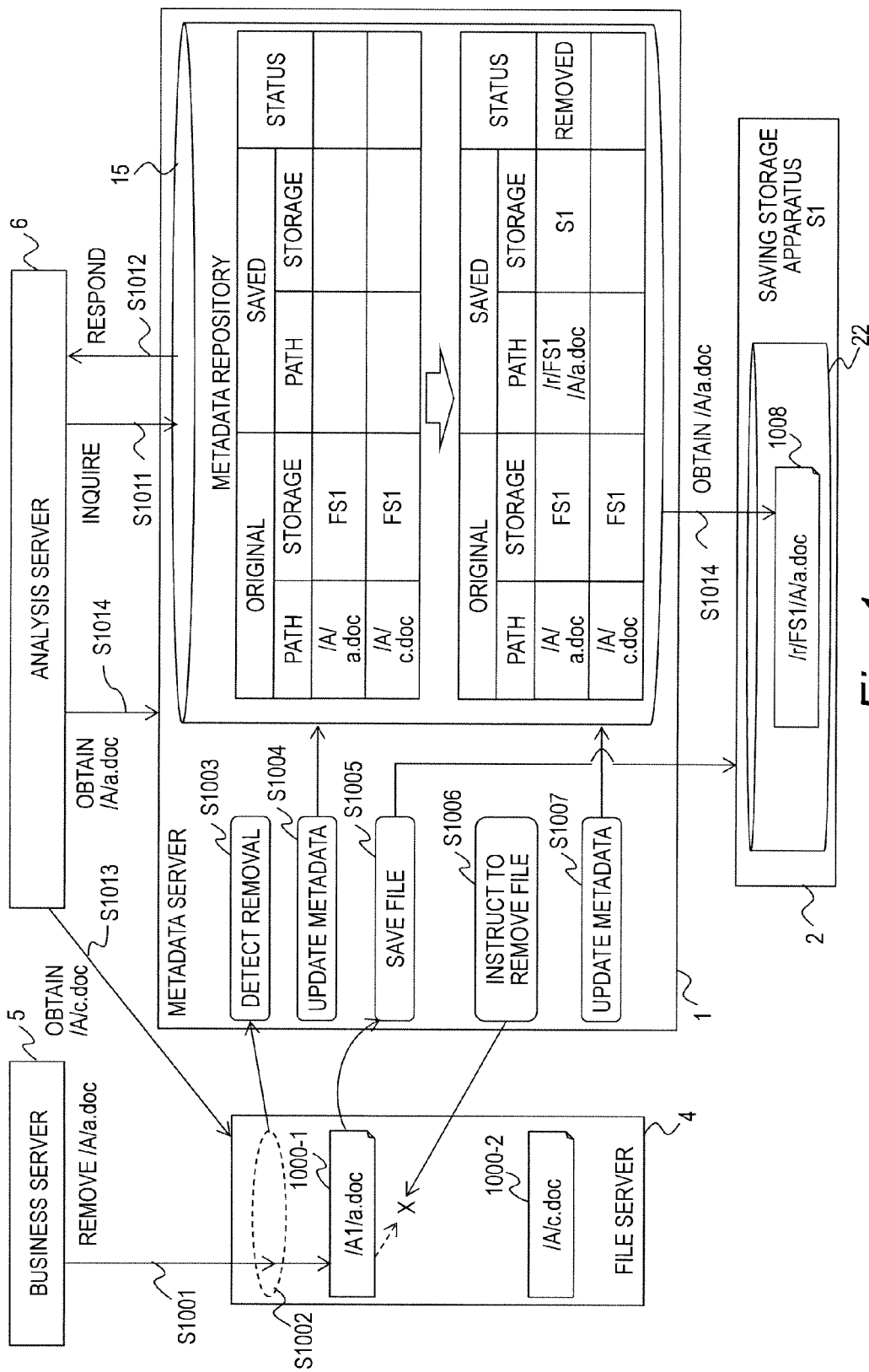
FIG. 1 is a block diagram outlining processing according to this invention.

FIG. 1 is a block diagram outlining processing according to this invention.

A computer system 500 according to this invention includes a metadata server 1, a saving storage apparatus 2, a plurality of file servers 4, a plurality of business servers 5, and a plurality of analysis servers 6.

The business server 5 is a computer for executing a predetermined business task, and a business program 51 operates thereon. The business program 51 executes the predetermined business task using files stored in the file servers 4.

In an example illustrated in FIG. 1, the business program 51 executes the predetermined business task using a file 1000-1 having a path name of "/A/a.doc" and a file 1000-2 having a path name of "/A/c.doc". When not distinguished, the files are hereinafter referred to as files 1000.

The analysis server 6 is a computer for analyzing the files 1000, and an analysis program 61 operates thereon. The analysis program 61 reads the files 1000-1 and 1000-2 used by the business program 51 and executes analytical processing such as statistical processing.

The metadata server 1 is a computer for managing a plurality of piece of metadata of the files stored in the plurality of file servers 4. The metadata server 1 according to this embodiment has a feature in that metadata on a file that has been removed from the file servers 4 is also managed.

The metadata as used herein refers to a set of attribute values set to a file. For example, the metadata includes an owner of the file, an owner group of the file, access control information, a creation date of the file, a modified date of the file, a metadata modification date of the file, a size of the file, and other user-defined attribute values.

The metadata server 1 manages a metadata repository in which the plurality of piece of metadata of the files is stored. The metadata repository includes a field for identifying a file stored in the file server 4, a field for identifying a file stored in the saving storage apparatus 2, and a field indicating a status of the file.

The field for identifying the file stored in the file server 4 includes a path name and a storage name. The field for identifying the file stored in the saving storage apparatus 2 includes a path name and a storage name. Moreover, the field indicating the status of the file stores information indicating whether or not the file is present in the file server 4.

Next, processing executed in a case where the business program 51 removes the file 1000-1 is outlined.

The business program 51 transmits to the file server 4 having an identification name of "FS1" a request to remove the file 1000-1 (Step S1001).

In a case of detecting the request to remove the file, the file server 4 suspends the removal of the file 1000-1 and notifies the metadata server 1 that the request to remove the file 1000-1 has been received (Step S1002).

In a case of receiving the notification from the file server 4 (Step S1003), the metadata server 1 updates a record corresponding to the file 1000-1 stored in a metadata repository 150 (Step S1004). To be specific, in the field indicating the status of the file, "removed" is stored to indicate that the file 1000-1 is to be removed.

Next, the metadata server 1 moves the file 1000-1 to the saving storage apparatus 2 (Step S1005). To be specific, the metadata server 1 obtains the file 1000-1 from the file server 4 and stores the file 1000-1 as a file 1008 in a file system 22 of the saving storage apparatus 2.

In the example illustrated in FIG. 1, the file 1008 is stored under a path name of "r/FS1/A/a.doc". It should be noted that path names in the saving storage apparatus 2 are set so as not to overlap.

Next, the metadata server 1 instructs the file server 4 to remove the file 1000-1 (Step S1006). In a case of receiving the instruction, the file server 4 removes the file 1000-1 and responds to the business program 51 with a completion of the removal of the file 1000-1.

Finally, the metadata server 1 updates the record corresponding to the metadata of the file 1000-1 in the metadata repository 150 (Step S1007). To be specific, in the field for identifying the file stored in the saving storage apparatus 2, the path name "r/FS1/A/a.doc" of the file 1008 and an identification name "S1" of the saving storage apparatus 2, in which the file 1008 is stored, are stored.

FIG. 1 illustrates a change in the metadata repository 150 before and after the removal of the file 1000-1.

Next, analytical processing in which the analysis program 61 analyzes files at present and in the past is outlined. A description is given here of the analytical processing after the file 1000-1 is removed from the file server 4 by the business program 51 and the file 1000-1 is moved to the saving storage apparatus 2.

The analysis program 61 inquires of the metadata server 1 about all files including the files that are currently stored and the files that were present in the past (Step S1011). To be specific, the analysis program 61 requests a list of all the files from the metadata server 1.

The metadata server 1 generates the list based on the metadata repository 150 and responds to the analysis program 61 with the generated list (Step S1012).

It should be noted that the list includes a plurality of entries including information for identifying the files. The entry includes fields indicating the path name of the file, an identification name of a stored storage apparatus, the metadata of the file in the file server 4, and a status of the file.

The entry of the file 1000-1 removed from the file server 4 further includes the saved path name of the file and the identification name of the saving storage apparatus 2. Moreover, the field indicating the status of the file of the entry stores information indicating that the file has been removed.

The analysis program 61 identifies locations of the files based on the list obtained from the metadata server 1.

In the example illustrated in FIG. 1, the analysis program 61 finds that two files having the path names of "/A/a.doc" and "/A/c.doc" have been present in the file server 4. Further, the analysis program 61 finds that, of the above-mentioned files, the file having the path name of "/A/a.doc" has been removed from the file server 4 and stored as the file 1008 having the path name of "r/FS1/A/a.doc" in the saving storage apparatus 2 having the identification name of "S1".

The analysis program 61 refers to the list to obtain all the files required for the analytical processing (Steps S1013 and S1014). In other words, the analysis program 61 obtains from the file server 4 the file 1000-2 stored in the file server 4 and obtains from the saving storage apparatus 2 the file 1008 corresponding to the file 1000-1 that has been removed from the file server 4.

As described above, the metadata server 1 may manage files that have been removed by the business program 51 during the execution of the business task so as to be analyzable by the analysis program 61.

In this manner, according to this invention, in a case where a file is to be removed from the file server 4, the file is moved to the saving storage apparatus 2 before being removed from the file server 4, and hence an unnecessary copy of the file is not created.

A file that is removed from the file server 4 and may be inquired of the metadata server 1 to obtain its content as with the file 1000-1 is hereinafter referred to as a removed file. Moreover, a copy of the removed file stored in the saving storage apparatus is referred to as a saved file. Moreover, the file that is to be removed and has been stored in the file server 4 before becoming the removed file is referred to as an original file. Moreover, a file that is stored in the file server 4 and has not been removed is referred to as a normal file.

First Embodiment

Figure 2:
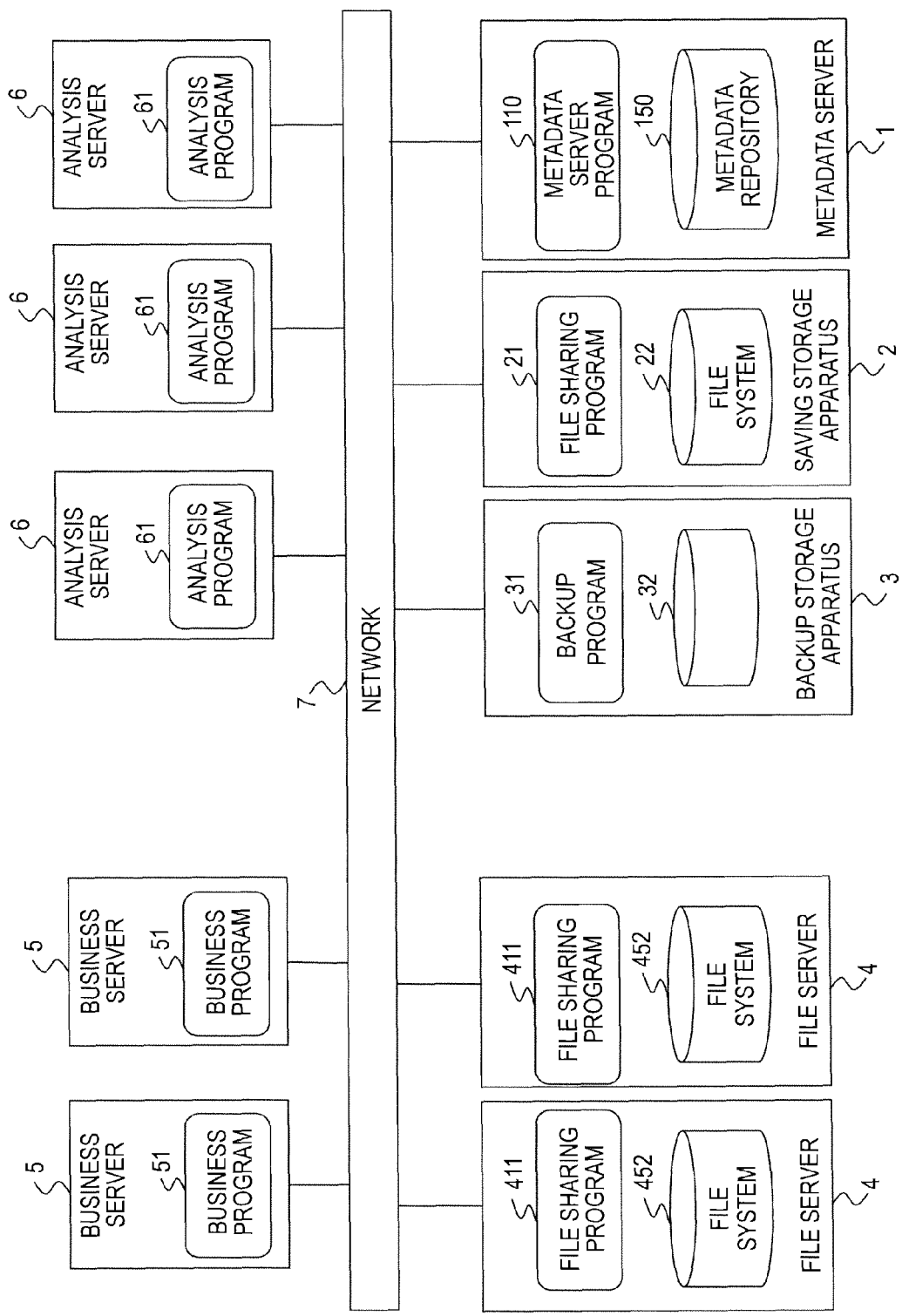
FIG. 2 is a block diagram illustrating a configuration of a computer system according to a first embodiment of this invention.

FIG. 2 is a block diagram illustrating a configuration of the computer system 500 according to a first embodiment of this invention.

The computer system 500 includes the metadata server 1, the saving storage apparatus 2, a backup storage apparatus 3, the plurality of file servers 4, the plurality of business servers 5, the plurality of analysis servers 6, and a network 7.

The metadata server 1, the saving storage apparatus 2, the backup storage apparatus 3, the file servers 4, the business servers 5, and the analysis servers 6 may communicate with each other via the network 7. It should be noted that the network 7 may be constituted by using a local area network (LAN), a wide area network (WAN), the Internet, or the like. This invention is not limited to a coupling system of the network 7.

The metadata server 1 is a computer for managing the metadata. It should be noted that the metadata server 1 may be a virtual machine generated by using a virtualization technology.

The metadata server 1 includes a metadata server program 110 and the metadata repository 150. The other components are described later.

The saving storage apparatus 2 is a storage apparatus for storing various files.

The storage apparatus as used herein refers to an apparatus that includes a controller (not shown), a network interface (not shown), and one or more storage media (not shown) and is capable of providing storage spaces of the storage media to a computer. The storage apparatus may use a plurality of storage media to constitute a redundant array of inexpensive disks (RAID), and further may use a physical storage space to generate a plurality of logical storage spaces. Moreover, the storage apparatus may construct a different file system for each of the logical storage spaces.

The saving storage apparatus 2 includes a file sharing program 21 and the file system 22. The file sharing program 21 stores a file in the file system 22 and reads the file from the file system 22 in accordance with a file access request received from the metadata server 1 via the network 7. The other components are described later.

The backup storage apparatus 3 is a storage apparatus for storing various files. It should be noted, however, that the backup storage apparatus 3 is used especially for the purpose of backing up the files. The backup storage apparatus 3 includes a backup program 31 and a file system 32. The other components are described later.

The file server 4 is a computer for storing various files and managing the files. In particular, the file server 4 stores files required by the business program 51 to execute business processing. The file server 4 includes a file sharing program 411 and a file system 452. The other components are described later.

It should be noted that on the computer, the file server 4 is also recognized as a type of storage apparatus.

The business server 5 is a computer for executing a program required to realize the business processing. It should be noted that the business server 5 may be a virtual machine generated by using the virtualization technology.

The business server 5 includes the business program 51. The business program 51 is a program for performing specified business processing, and obtains data required for the business processing from the file server 4 to execute the predetermined business processing. The other components are described later.

The analysis server 6 is a computer for executing a program required to realize the analytical processing. It should be noted that the analysis server 6 may be a virtual machine generated by using the virtualization technology.

The analysis server 6 includes the analysis program 61. The analysis program 61 reads a file stored in the file server 4 and used by the business program 51 for the business processing, and uses the read file to execute the analytical processing.

Figure 3:
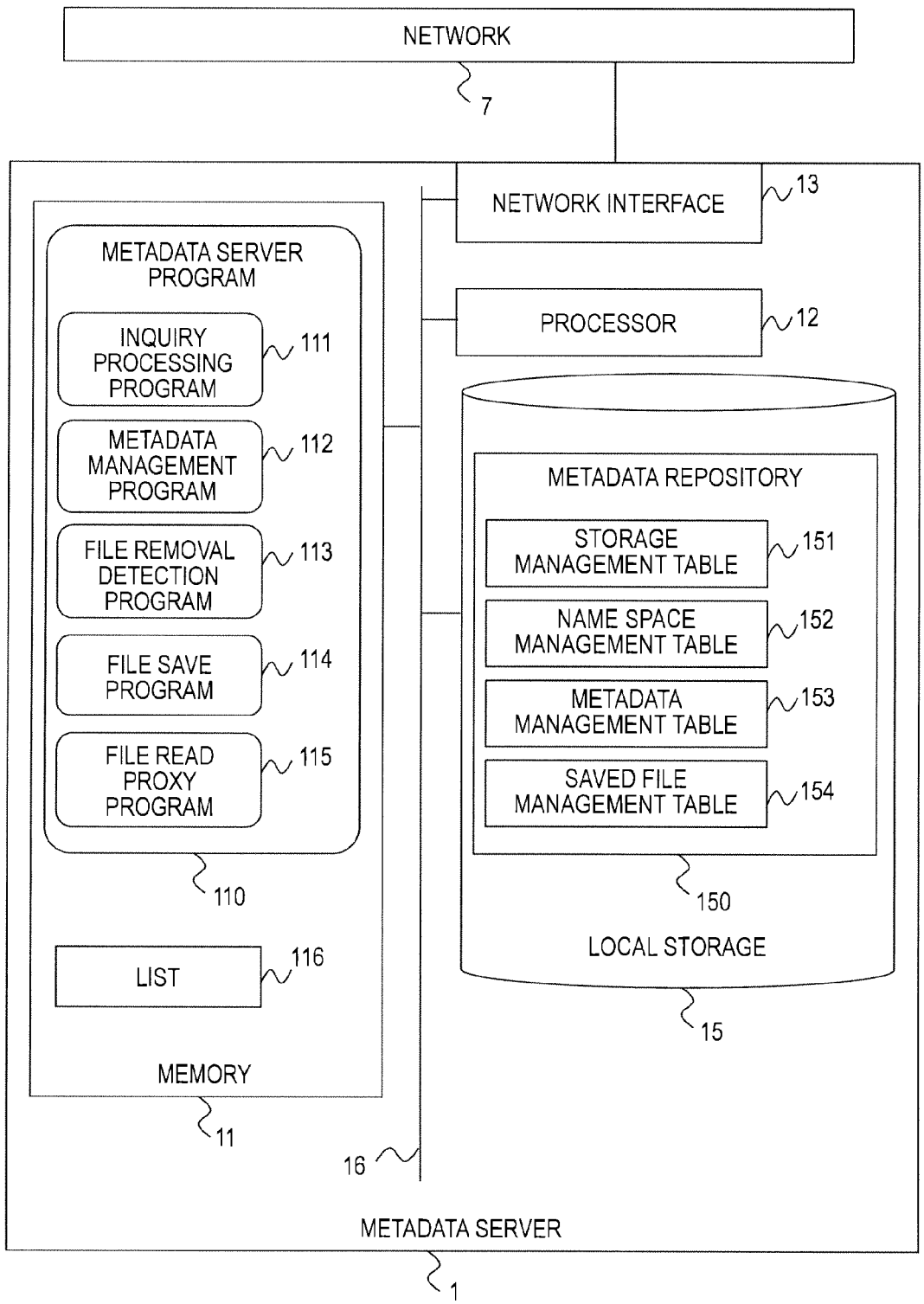
FIG. 3 is a block diagram illustrating a configuration of a metadata server according to the first embodiment of this invention.

FIG. 3 is a block diagram illustrating a configuration of the metadata server 1 according to the first embodiment of this invention.

The metadata server 1 includes a memory 11, a processor 12, a network interface 13, and a local storage 15, and the components are connected to each other via an internal bus 16.

The processor 12 executes programs stored in the memory 11. The processor 12 executes the programs so that functions of the metadata server 1 may be realized.

The memory 11 stores the metadata server program 110. The metadata server program 110 is a program for realizing the functions of the metadata server 1, and includes a plurality of subprograms.

To be specific, the metadata server program 110 includes an inquiry processing program 111, a metadata management program 112, a file removal detection program 113, a file save program 114, and a file read proxy program 115.

The inquiry processing program 111 is a program for executing processing on inquiries from the file server 4 and the analysis server 6. The metadata management program 112 is a program for managing the metadata.

The file removal detection program 113 is a program for detecting that a file is to be removed from the file server 4. The file save program 114 is a program for copying the file to the saving storage apparatus 2. The file read proxy program 115 is a program for reading the file from the saving storage apparatus 2.

Each of the above-mentioned subprograms may be executed as an independent process or as a partial program such as a library constituting the metadata server program 110. It should be noted that details of the processing executed by the subprograms are described later with reference to the figures.

Moreover, the memory 11 also stores a list 116 generated when an inquiry from the analysis server 6 is received. The list 116 stores information required to obtain files from the file server 4 or the saving storage apparatus 2.

The local storage 15 is a storage medium of the metadata server 1, and may include a hard disk drive (HDD), a solid state drive (SSD), and a non-volatile memory (NVRAM).

The local storage 15 stores the metadata repository 150. It should be noted that the metadata repository 150 may be stored in the memory 11 or in a storage apparatus coupled to the metadata server 1.

The metadata repository 150 includes a storage management table 151, a name space management table 152, a metadata management table 153, and a saved file management table 154. In the following, configurations of the tables are described.

FIG. 4 is an explanatory diagram illustrating an example of a configuration of the storage management table 151 according to the first embodiment of this invention.

The storage management table 151 stores information on storage apparatus managed by the metadata server 1. To be specific, the storage management table 151 includes one or more records, and each of the records includes a storage ID 1511, a storage name 1512, a type 1513, and an IP address 1514.

Each record of the storage management table 151 corresponds to one storage apparatus managed by the metadata server 1.

The storage ID 1511 stores an identifier used by the metadata server 1 to uniquely identify the storage apparatus. The storage name 1512 stores an identification name set to the storage apparatus in the computer system 500.

The type 1513 stores a type of usage of the storage apparatus. For example, "file server" is stored in a case where the storage apparatus is the file server 4, and "archive storage" is stored in a case of a storage apparatus for storing archive files.

The IP address 1514 stores an IP address assigned to the storage apparatus.

In the example illustrated in FIG. 4, the first record stores information on a file server 4 having the storage ID 1511 of "s1000", the storage name 1512 of "FS1", the type 1513 of "file server", and the IP address 1514 of "192.168.10.100".

Similarly, the second record stores information on a file server 4, and the third record stores information on a saving storage apparatus 2.

FIG. 5 is an explanatory diagram illustrating an example of a configuration of the name space management table 152 according to the first embodiment of this invention.

The name space management table 152 stores information on name spaces in the storage apparatus managed by the metadata server 1. The name space as used herein is a logical unit for identifying a storage space in which the file is stored. In the case of the file server 4, a name such as a share name or a public name is known to correspond to the name space. Moreover, a similar concept is also known for the case of the saving storage apparatus 2.

The name space management table 152 includes one or more records, and each of the records includes a name space ID 1521, a name space name 1522, a storage ID 1523, a capacity 1524, a protocol 1525, a used volume 1526, and a usage 1527.

Each record of the name space management table 152 corresponds to a name space in the file server 4 or the saving storage apparatus 2.

The name space ID 1521 stores an identifier used by the metadata server 1 to uniquely identify the name space. The name space name 1522 stores a name used by the storage apparatus to uniquely identify the name space.

The storage ID 1523 stores an identifier of a storage apparatus providing a logical storage space corresponding to the name space. It should be noted that the storage ID 1523 is the same as the storage ID 1511.

The capacity 1524 stores a capacity of the logical storage space corresponding to the name space. The protocol 1525 stores a protocol used to access the logical storage space corresponding to the name space. The used volume 1526 stores a used volume of the logical storage space corresponding to the name space.

The usage 1527 stores a usage of the logical storage space corresponding to the name space. For example, "primary" is stored in a case of a logical storage space used by the business program 51. Moreover, "saved" is stored in a case of a logical storage space storing saved files.

In the example illustrated in FIG. 5, the first and second records store information on name spaces on the file server 4 having the storage ID 1523 of "s1000".

The first record stores "n1001" in the name space ID 1521, "share1" in the name space name 1522, "s1000" in the storage ID 1523, "20 TB" in the capacity 1524, "nfs" in the protocol 1525, "5 TB" in the used volume 1526, and "primary" in the usage 1527.

Similarly, the second record stores information on a name space having the name space name 1522 or a share name of "share2". Moreover, the third record stores information on a name space of another file server 4 having the name space name 1522 or a share name of "share3". Moreover, the fourth record stores information on a name space of a saving storage apparatus 2 having the name space name 1522 of "r".

FIG. 6 is an explanatory diagram illustrating an example of a configuration of the metadata management table 153 according to the first embodiment of this invention.

The metadata management table 153 stores information indicating locations of files and metadata. To be specific, the metadata management table 153 includes one or more records, and each of the records includes a metadata ID 1531, a path 1532, a name space ID 1533, original metadata 1534, and a file status 1535.

Each record of the metadata management table 153 corresponds to a file stored in the file server 4 or a removed file.

The metadata ID 1531 stores an identifier for identifying the metadata. The path 1532 stores a path name indicating a location at which the file is stored.

The name space ID 1533 stores an identifier for identifying a name space of a logical storage space in which the file is stored. The name space ID 1533 is the same as the name space ID 1521.

The original metadata 1534 stores metadata (not shown) in the file server 4.

The file status 1535 stores information indicating whether or not the file is present in the file server 4. To be specific, "present" is stored in a case where the file is present in the file server 4, and "removed" is stored in a case where the file is not present in the file server 4.

A record having "present" stored in the file status 1535 indicates that a file corresponding to the record is stored at the location indicated by the path 1532 and the name space ID 1533.

On the other hand, a record having "removed" stored in the file status 1535 indicates that a file corresponding to the record is not currently stored at the location indicated by the path 1532 and the name space ID 1533, and is currently a removed file.

The metadata of the file is managed by the file server 4 for each of the files, and the metadata server 1 may obtain the metadata from the file server 4 through an application programming interface (API) provided for each type of name space.

In the example illustrated in FIG. 6, the metadata management table 153 stores three records. It should be noted that the number of records is merely an example and is not intended to limit this invention. In other words, the metadata management table 153 stores records corresponding to the metadata of all the files managed by the metadata server 1.

The first record represents metadata corresponding to the file "/share1/a.doc" stored in the name space "share1" of the file server 4, and stores "100" in the metadata ID 1531.

The first record stores in the path 1532 "/share1/a.doc", which is a path name of the corresponding file, and stores in the name space ID 1533 "n1001", which is an identifier of the name space "share1". Moreover, the first record stores in the original metadata 1534 the metadata of the corresponding file in the file server 4, which is not shown here. Further, the first record stores "present" in the file status 1535.

The second record represents metadata corresponding to the file "/share1/b.doc" stored in the name space "share1" of the file server 4, and stores "110" in the metadata ID 1531. Moreover, the second record stores "removed" in the file status 1535. Therefore, the second record represents that the file "/share1/b.doc" is not currently stored at the location indicated by the path 1532 and the name space ID 1533, and is a removed file.

The third record represents metadata corresponding to the file "/share1/c.doc" stored in the name space "share1" of the file server 4, and stores "120" in the metadata ID 1531.

FIG. 7 is an explanatory diagram illustrating an example of a configuration of the saved file management table 154 according to the first embodiment of this invention.

The saved file management table 154 stores information on locations (save destinations) of saved files. To be specific, the saved file management table 154 includes one or more records, and each of the records includes a metadata ID 1541, a saved path 1542, and a saved name space ID 1543.

Each record of the saved file management table 154 corresponds to a saved file stored in the saving storage apparatus 2.

It should be noted that the metadata server 1 updates the saved file management table 154, in a case of detecting a file is to be removed from the file server 4, and being moved the file to the saving storage apparatus 2.

The metadata ID 1541 stores an identifier for identifying the metadata. The metadata ID 1541 is the same as the metadata ID 1531.

The saved path 1542 stores the path name indicating the location at which the saved file is stored. The saved name space ID 1543 stores an identifier for identifying a name space in which the saved file is stored.

In the example illustrated in FIG. 7, the first record stores information on a saved file corresponding to the file "/share1/b.doc" in FIG. 6.

The metadata ID 1541 stores the identifier "110" of the metadata corresponding to the file "/share1/b.doc". Moreover, the saved path 1542 stores a path name "/r/FS1/share1/b.doc" of a location of the saved file corresponding to the file "/share1/b.doc". Further, the saved name space ID 1543 stores an identifier "n3001" of a name space in which the saved file "/r/FS1/share1/b.doc" is stored.

Next, a configuration of the file server 4 is described.

Figure 8:
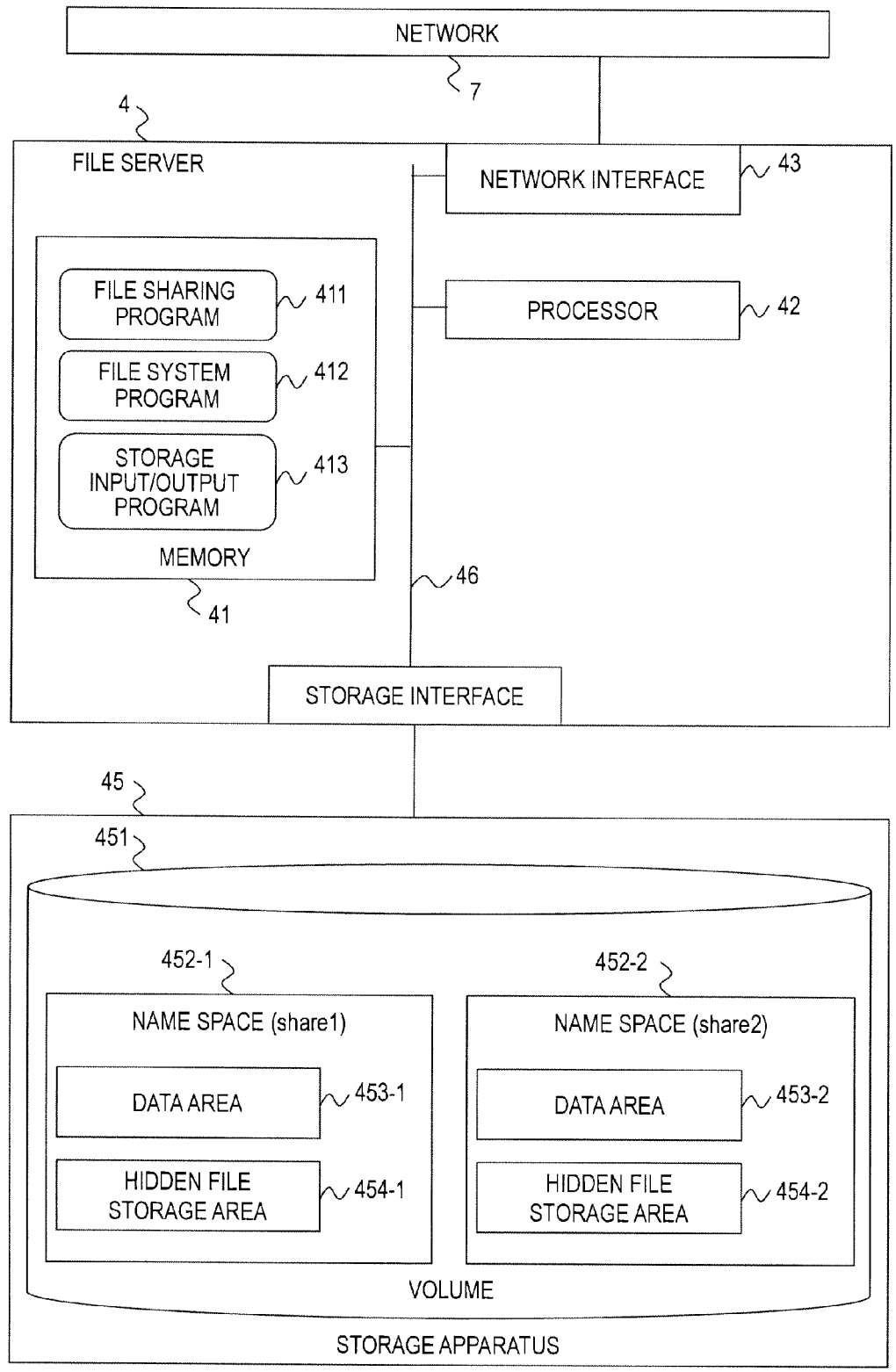
FIG. 8 is a block diagram illustrating a configuration of a file server according to the first embodiment of this invention.

FIG. 8 is a block diagram illustrating the configuration of the file server 4 according to the first embodiment of this invention.

The file server 4 includes a memory 41, a processor 42, a network interface 43, and a storage interface 44, and is coupled to a storage apparatus 45.

The processor 42 executes programs stored in the memory 41. The processor 42 executes the programs so that functions of the file server 4 may be realized.

The memory 41 stores the file sharing program 411, a file system program 412, and a storage input/output program 413.

The file sharing program 411 is a program for providing a function for the business program 51, the analysis program 61, and the metadata server program 110 to access a file stored in the storage apparatus 45 via the network 7.

The file system program 412 is a program for configuring the file system for storing the file in the storage apparatus 45 and managing input/output of the file.

The storage input/output program 413 is a program for managing read processing and write processing of data with respect to the storage apparatus 45.

The processor 42 executes the above-mentioned programs so that the file server 4 realizes a file sharing function via the network 7.

The storage apparatus 45 generates a storage volume 451 therein. The storage volume 451 is constituted of a storage space of a storage medium such as a hard disk drive, a solid state drive, or a non-volatile memory of the storage apparatus 45.

The storage volume 451 includes two name spaces 452-1 and 452-2. "share1" is set as an identification name to the name space 452-1, and "share1" is set as an identification name to the name space 452-2.

The name spaces 452-1 and 452-2 include data areas 453-1 and 453-2 and hidden file storage areas 454-1 and 454-2, respectively.

The data areas 453-1 and 453-2 are areas for storing files that can be referenced by the business program 51. The hidden file storage areas 454-1 and 454-2 are areas for temporarily storing files removed by the business program 51.

The files stored in the hidden file storage areas 454-1 and 454-2 are treated as files that are not present by the business program 51. In other words, the business program 51 cannot recognize the files stored in the hidden file storage areas 454-1 and 454-2.

The data areas 453-1 and 453-2 and the hidden file storage areas 454-1 and 454-2 may be included in different storage volumes 451, or may each be one directory in a single file system tree. Moreover, the name spaces 452-1 and 452-2 may be included in different storage volumes 451, or may each be one directory in a single file system tree.

In this embodiment, the two name spaces are defined in the storage volume 451. However, this invention is not limited thereto, and two or more name spaces may be defined.

When not distinguished, the data areas 453-1 and 453-2 are hereinafter represented as data areas 453. Moreover, when not distinguished, the hidden file storage areas 454-1 and 454-2 are represented as hidden file storage areas 454.

Figure 9:
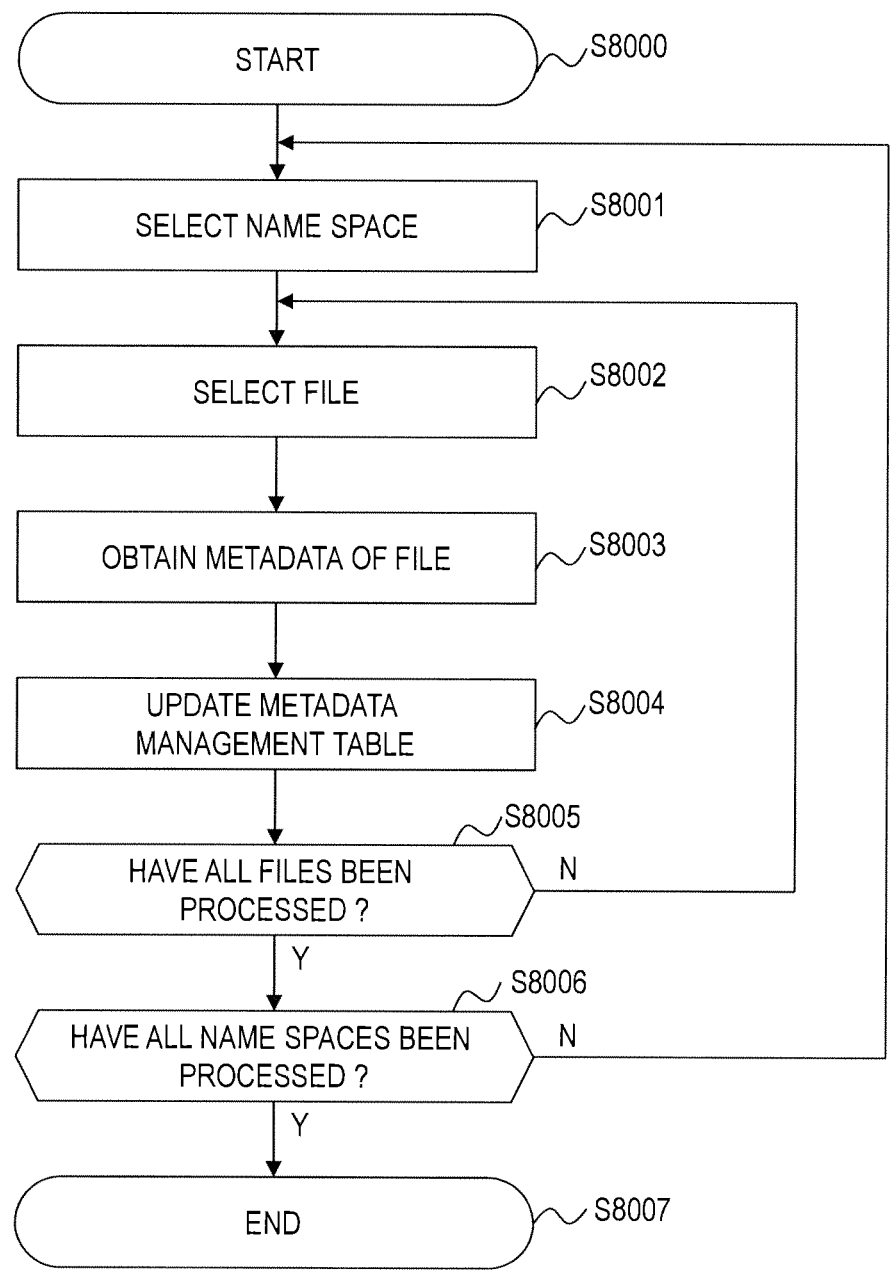
FIG. 9 is a flowchart illustrating processing executed by a metadata management program according to the first embodiment of this invention.

FIG. 9 is a flowchart illustrating processing executed by the metadata management program 112 according to the first embodiment of this invention.

The metadata management program 112 executes this processing periodically or in accordance with a user's request in order to update the metadata repository 150.

In a case where the processing is started (Step S8000), the metadata management program 112 refers to the name space management table 152 to select one name space to be processed (Step S8001).

Next, the metadata management program 112 selects one file to be processed from among files stored in the selected name space (Step S8002).

It should be noted that as a method of selecting the file, a method of following a file system tree in the name space in order from the upper directory may be contemplated.

The metadata management program 112 obtains metadata of the file to be processed from the file server 4 (Step S8003).

The metadata management program 112 updates the metadata management table 153 based on the obtained metadata (Step S8004). To be specific, the following processing is executed.

The metadata management program 112 determines whether or not a record corresponding to the selected file is registered. To be specific, the metadata management program 112 determines whether or not there is a record having the path 1532 and the name space ID 1533 that match the identifier of the name space to be processed and the path name of the file to be processed.

It should be noted that a method of determining whether or not the obtained metadata and the original metadata match may be employed. For example, an i-node number, which is identification information of the file in the file server 4, may be used.

In a case where it is determined that the record corresponding to the selected file is not registered, the metadata management program 112 registers a new record with the metadata management table 153. At this time, the metadata management program 112 generates an identifier for uniquely identifying the metadata and stores the generated identifier in the metadata ID 1531.

Further, the metadata management program 112 stores in the path 1532 the path name of the file to be processed in the selected name space, and stores the identifier of the selected name space in the name space ID 1533. The metadata management program 112 also stores the obtained metadata in the original metadata 1534, and stores "present" in the file status 1535.

On the other hand, in a case where the record corresponding to the selected file is registered, the metadata management program 112 stores the obtained metadata in the original metadata 1534 of the existing record.

The metadata management program 112 determines whether or not the processing is complete for all the files stored in the name space to be processed (Step S8005).

In a case where it is determined that the processing is not complete for all the files stored in the name space to be processed, the metadata management program 112 returns to Step S8002 and executes similar processing (Steps S8002 to S8005).

In a case where it is determined that the processing is complete for all the files stored in the name space to be processed, the metadata management program 112 determines whether or not the processing is complete for all the name spaces under its management (Step S8006).

In a case where it is determined that the processing is not complete for all the name spaces under its management, the metadata management program 112 returns to Step S8001 and executes similar processing (Steps S8001 to S8006).

In a case where it is determined that the processing is complete for all the name spaces under its management, the metadata management program 112 ends the processing (Step S8007).

Figure 10:
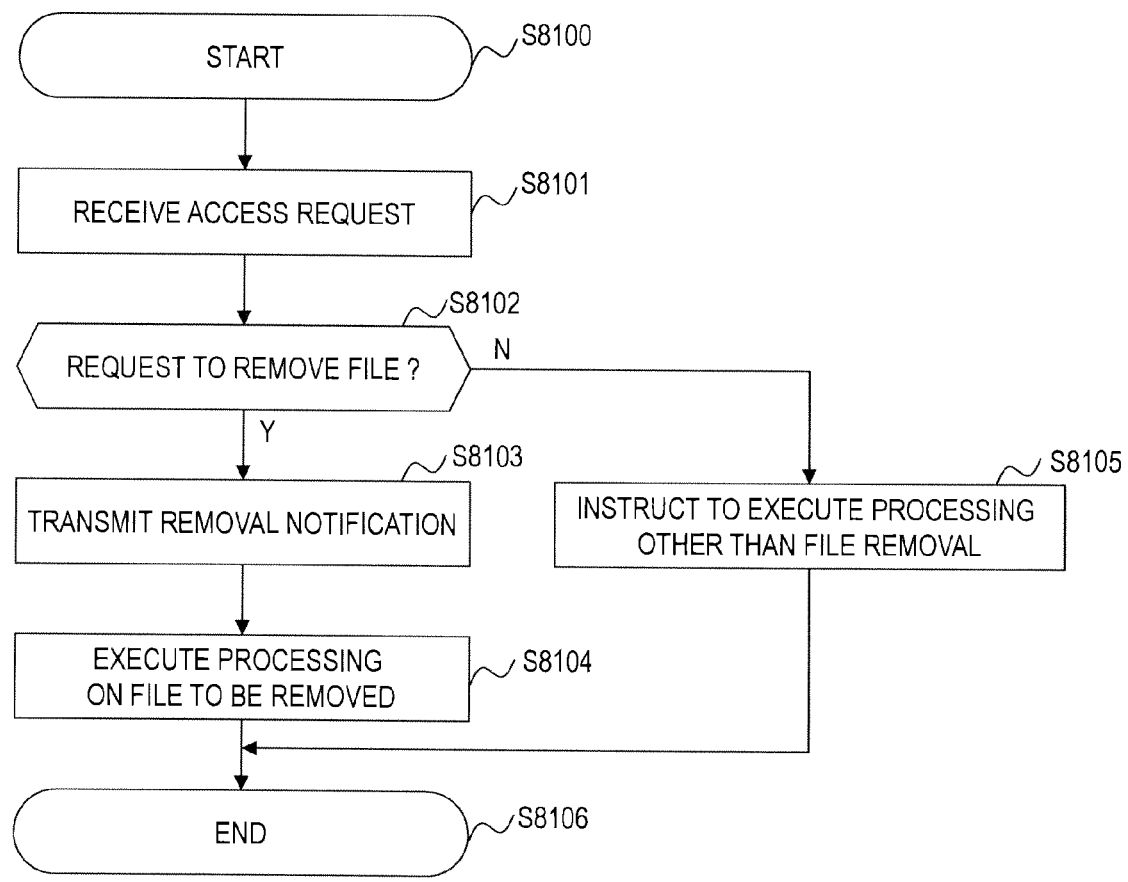
FIG. 10 is a flowchart illustrating processing executed by a file sharing program according to the first embodiment of this invention.

FIG. 10 is a flowchart illustrating processing executed by the file sharing program 411 according to the first embodiment of this invention.

The file server 4 executes the following processing, in a case where an access request to a file is received from the business program 51 or another program.

In a case where the processing is started (Step S8100), the file sharing program 411 receives an access request to a predetermined file from the business program 51 or another program via the network 7 (Step S8101).

The file sharing program 411 determines whether or not the received access request is a request to remove the file (Step S8102).

In a case where it is determined that the received access request is not the request to remove the file, the file sharing program 411 instructs the file system program 412 to execute processing in accordance with the received access request (Step S8105). Thereafter, the file sharing program 411 transmits a response to the program that has transmitted the access request, and ends the processing (Step S8106).

In a case where it is determined that the received access request is the request to remove the file, the file sharing program 411 notifies the file removal detection program 113 of the metadata server 1 that the access request including the request to remove the file has been received (Step S8103).

The notification that the access request that requests the removal of the file has been received is hereinafter represented as a removal notification. Moreover, the file requested for removal by the business program 51 or another program is referred to as a file to be removed. The file to be removed is moved to the saving storage apparatus 2 by the metadata server 1 in the end. In a case where the file to be removed is moved to the saving storage apparatus 2 and "removed" is stored in the file status 1535 of the metadata management table 153, the file becomes a removed file.

It should be noted that the removal notification includes information such as the path name of the file to be removed, a name space in which the file to be removed is stored, the identification name of the file server, and metadata of the file to be removed.

In a case of receiving a response to the removal notification from the file removal detection program 113, the file sharing program 411 executes processing on the file to be removed in accordance with the response (Step S8104). It should be noted that the response transmitted from the file removal detection program 113 includes an instruction from the file save program 114. To be specific, the following processing is executed.

In a case where the received response includes an instruction to hide the file to be removed, the file sharing program 411 moves the file to be removed to the hidden file storage area 454. This disables the business program 51 from accessing the file to be removed. In other words, the file is recognized by the business program 51 as having been removed.

Moreover, in a case where the received response includes an instruction to remove the file to be removed, the file sharing program 411 removes the file to be removed.

It should be noted that the file sharing program 411 outputs the instructions to the file system program 412 to realize the moving processing and the removal processing of the file to be removed.

Hereinafter, the file to be removed stored in the hidden file storage area 454 is referred to as a hidden file.

In a case where the processing on the file to be removed is finished, the file sharing program 411 ends the processing (Step S8106).

In this embodiment, the file sharing program 411 executes the processing, but the processing may be executed by another program such as the file system program 412.

Figure 11A:
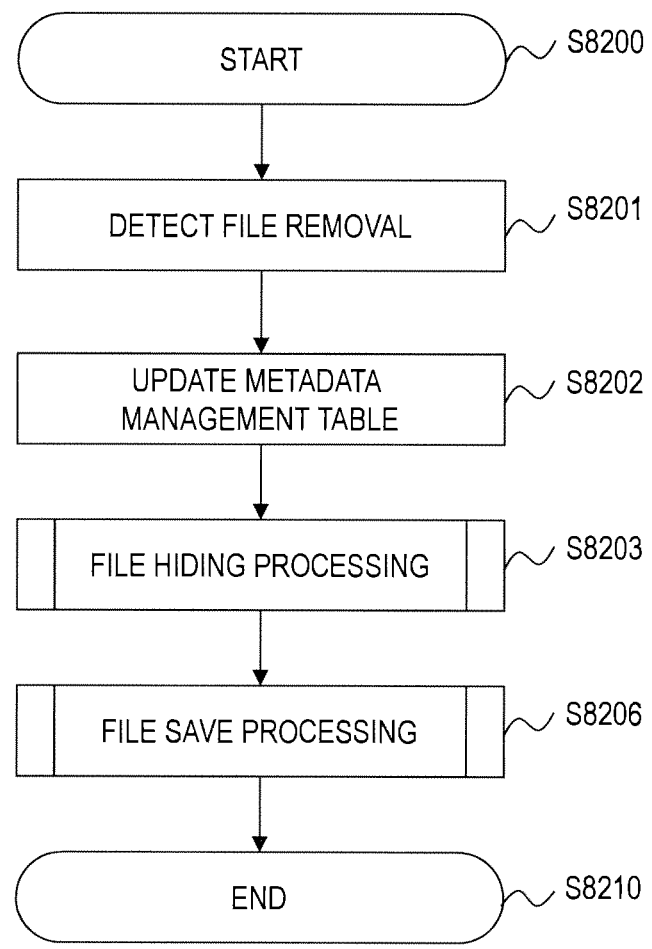
FIGS. 11A, 11B, and 11C are flowcharts illustrating processing executed by a file removal detection program according to the first embodiment of this invention.
Figure 11B:
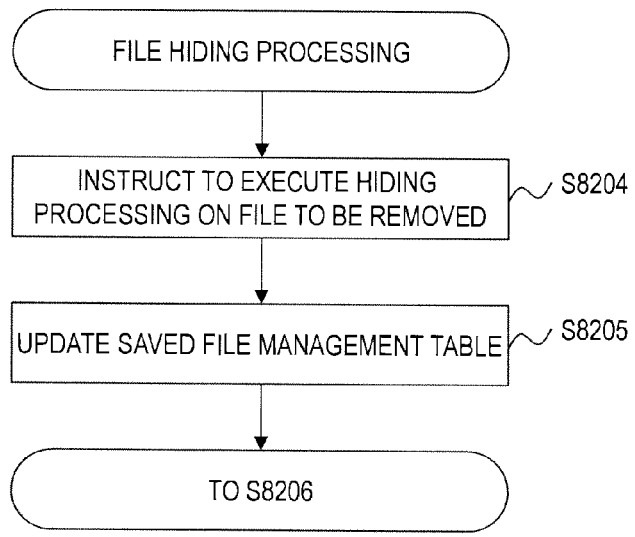
Figure 11C:
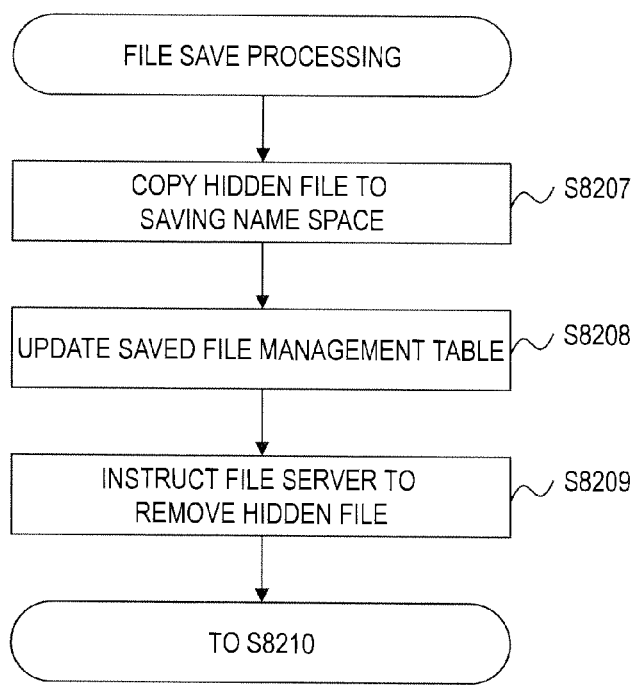

FIGS. 11A, 11B, and 11C are flowcharts illustrating processing executed by the file removal detection program 113 according to the first embodiment of this invention.

In a case where the processing is started (Step S8200), the file removal detection program 113 detects that a file is to be removed from the file server 4 (Step S8201). The file removal detection program 113 recognizes the file as a file to be removed.

In this embodiment, the file removal detection program 113 may detect that the file is to be removed from the file server 4 by receiving the removal notification from the file sharing program 411 (see Step S8103). It should be noted that the notification includes the path name of the file to be removed, the name space name, the metadata, and the like.

The file removal detection program 113 updates a record corresponding to the file to be removed of the metadata management table 153 (Step S8202).

To be specific, the file removal detection program 113 refers to the metadata management table 153 based on the information included in the received removal notification to identify the record corresponding to the file to be removed, and stores "removed" in the file status 1535 of the record.

The file removal detection program 113 executes file hiding processing on the file to be removed for the file server 4 (Step S8203). In the file hiding processing, the following processing is executed.

First, the file removal detection program 113 instructs the file server 4 that has transmitted the removal notification to execute the hiding processing on the file to be removed (Step S8204).

Receiving the instruction to execute the hiding processing, the file sharing program 411 of the file server 4 moves the file to be removed to the hidden file storage area 454. As a result, the removed file is treated as a hidden file. It should be noted that a path name of the hidden file may be automatically determined by the file sharing program 411 or the file system program 412, or may be automatically determined by the file removal detection program 113.

Next, the file removal detection program 113 updates the saved file management table 154 (Step S8205). To be specific, the following processing is executed.

The file removal detection program 113 adds a new record to the saved file management table 154, and stores the metadata ID 1531 of the record corresponding to the file to be removed in the metadata ID 1541 of the record. The file removal detection program 113 stores the path name of the hidden file in the saved path 1542, and stores in the saved name space ID 1543 an identifier of a name space in which the hidden file is stored.

This concludes the description of the hiding processing on the file to be removed.

Next, the file removal detection program 113 executes the save processing on the hidden file (Step S8206), and ends the processing (Step S8210). In the save processing on the hidden file, the following processing is executed.

First, the file removal detection program 113 calls the file save program 114, and instructs the file save program 114 to execute the save processing on the hidden file.

In a case of receiving the instruction to execute the save processing, the file save program 114 copies the hidden file in the name space on the saving storage apparatus 2 (Step S8207). The copied file becomes a saved file. At this time, as the path name of the saved file, a path name that is unique in the name space in which the saved file is stored is determined.

The file save program 114 provides a notification of completion of the save processing on the hidden file along with the information on the saved file.

Next, the file removal detection program 113 updates the saved file management table 154 based on the information included in the received completion notification (Step S8208). To be specific, the file removal detection program 113 stores the path name of the saved file in the saved path 1542 of the record added in Step S8205, and stores in the saved name space ID 1543 an identifier of a name space in which the saved file is stored.

Next, the file removal detection program 113 instructs the file server 4 to remove the hidden file (Step S8209). In a case of receiving the instruction, the file server 4 removes the hidden file from the name space corresponding to the hidden file storage area 454.

It should be noted that the file server 4 may periodically inquire of the metadata server 1 whether or not there is a file to be removed. In this case, the file removal detection program 113 may not provide the instruction to remove the hidden file.

FIG. 12 is an explanatory diagram illustrating the metadata management table 153 after the file is moved according to the first embodiment of this invention. FIG. 13 is an explanatory diagram illustrating the saved file management table 154 after the file is moved according to the first embodiment of this invention.

A description is given here as an example of a case where the file "share1/a.doc" stored in the name space "share1" of the file server 4 has been moved to the saving storage apparatus 2.

When FIGS. 6 and 12 are compared, it can be seen that the file status 1535 of the first record corresponding to the file "share1/a.doc" has been changed from "present" to "removed". This means that the file "share1/a.doc" has become the removed file.

Moreover, when FIGS. 7 and 13 are compared, it can be seen that the second record is newly added to the saved file management table 154. The second record stores "100" in the metadata ID 1541. Therefore, it can be seen that the second record is a record storing information on the file for which the identifier of the metadata is "100", that is, a saved file corresponding to the file "share1/a.doc".

Moreover, referring to the saved path 1542 and the saved name space ID 1543, it can be seen that the path name of the saved file corresponding to the file "share1/a.doc" is "r/FS1/share1/a.doc", and that the name space is identified by the saved name space ID 1543 of "n3001", that is, the name space "r" of the saving storage apparatus 2.

Figure 14:
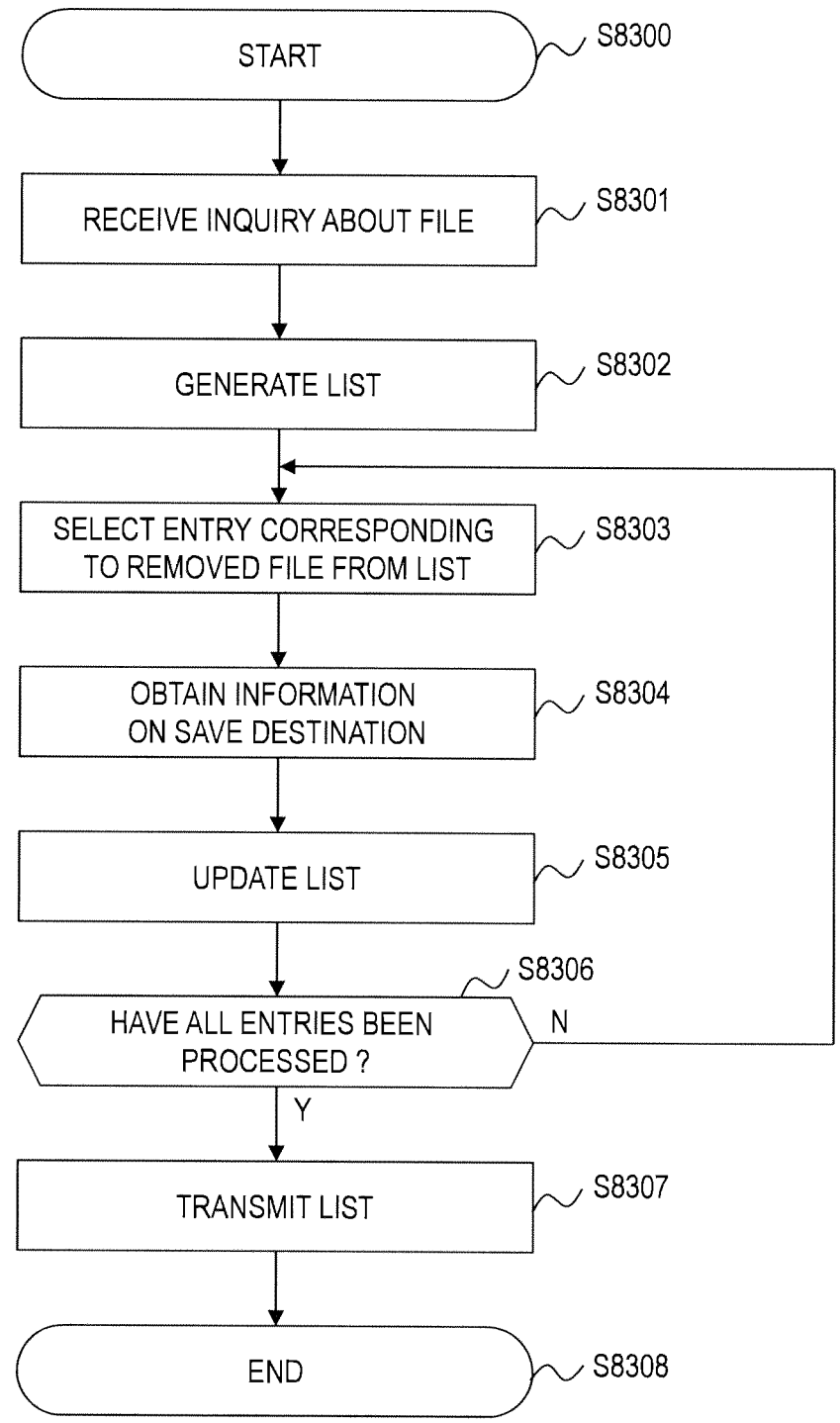
FIG. 14 is a flowchart illustrating processing executed by a inquiry processing program according to the first embodiment of this invention.

FIG. 14 is a flowchart illustrating processing executed by the inquiry processing program 111 according to the first embodiment of this invention.

The inquiry processing program 111 executes processing, in a case where requested by the analysis program 61 to output a list of the files managed by the metadata server 1.

In a case where the processing is started (Step S8300), the inquiry processing program 111 receives an inquiry about the files from the analysis program 61 (Step S8301).

The inquiry may include conditions on the files to be output. The conditions may include, for example, files including a particular character string in the path name, files modified in a particular period of time, files of a particular owner, files to which a particular access right is set, files stored in a particular file server or name space, files that were stored in the particular file server or name space, or the like. Moreover, conditions on the removed file may be specified, such as being a removed file, not being a removed file, both of removed files and files that are not removed files. Further, a logical disjunction or a logical conjunction of sets of the files satisfying the above-mentioned conditions may also be specified.

The inquiry processing program 111 refers to the metadata repository 150 to generate the list 116 of the files satisfying the specified conditions on the memory 11 (Step S8302). To be specific, the inquiry processing program 111 refers to the storage management table 151, the name space management table 152, and the metadata management table 153 to generate the list 116.

FIGS. 15A and 15B are explanatory diagrams illustrating an example of a configuration of the list 116 according to the first embodiment of this invention.

The list 116 stores information on the files managed by the metadata server 1. To be specific, the list 116 includes a metadata ID 1161, a path 1162, original metadata 1163, a storage ID 1164, an IP address 1165, a name space ID 1166, a file status 1167, and save destination information 1168.

The metadata ID 1161 stores an identifier for identifying metadata. The metadata ID 1161 is the same as the metadata ID 1531.

The path 1162 stores a path indicating the location at which the file is stored. The path 1162 is the same as the path 1532.

The original metadata 1163 stores the metadata of the file. The original metadata 1163 is the same as the original metadata 1153.

The storage ID 1164 stores an identifier of a storage apparatus in which the file is stored. The storage ID 1164 is the same as the storage ID 1511.

The IP address 1165 stores an assigned IP address of the storage apparatus. The IP address 1165 is the same as the IP address 1514.

The name space ID 1166 stores an identifier used by the metadata server 1 to uniquely identify a name space. The name space ID 1166 is the same as the name space ID 1521.

The file status 1167 stores information indicating whether or not the file is present in the file server 4. The file status 1167 is the same as the file status 1535.

The save destination information 1168 stores information on a saved file. It should be noted that the save destination information 1168 does not store the information, in a case where the file is not a saved file.

The save destination information 1168 includes a saved path 11681, a storage ID 11682, an IP address 11683, and a saved name space ID 11684.

The saved path 11681 stores a path indicating the location at which the saved file is stored. The saved path 11681 is the same as the saved path 1542.

The storage ID 11682 stores an identifier of the storage apparatus in which the saved file is stored. The storage ID 11682 is the same as the storage ID 1511.

The IP address 11683 stores an assigned IP address of the storage apparatus in which the saved file is stored. The IP address 11683 is the same as the IP address 1514.

The saved name space ID 11684 stores an identifier for identifying the name space in which the saved file is stored. The saved name space ID 11684 is the same as the saved name space ID 1543.

In Step S8302, information is stored in the metadata ID 1161, the path 1162, the original metadata 1163, the storage ID 1164, the IP address 1165, the name space ID 1166, and the file status 1167.

This concludes the description of the list 116. The description returns to FIG. 14.

The inquiry processing program 111 selects one entry corresponding to the removed file from the generated list (Step S8303). To be specific, the inquiry processing program 111 selects an entry storing "removed" in the file status 1167. It should be noted that a method of selecting an entry in order from the top may be contemplated, in a case where there are a plurality of entries corresponding to removed files.

The inquiry processing program 111 refers to the saved file management table 154 to obtain information on a save destination of the removed file corresponding to the selected entry (Step S8304).

To be specific, the inquiry processing program 111 identifies a record that matches the metadata ID 1161 of the selected entry from the saved file management table 154.

The inquiry processing program 111 obtains the saved path 1542 and the saved name space ID 1543 from the identified record. Further, the inquiry processing program 111 uses the saved name space ID 1543 to obtain from the storage management table 151 and the name space management table 152 the identification name, the IP address, and the identification name of the name space of the saving storage apparatus 2 in which the saved file is stored.

Next, based on the information obtained in Step S8304, the inquiry processing program 111 updates the list 116 (Step S8305). To be specific, the information obtained in Step S8304 is stored in the save destination information 1169 of the selected entry.

The inquiry processing program 111 determines whether or not the processing is complete for entries corresponding to all the removed files included in the list 116 (Step S8306).

In a case where it is determined that the processing is not complete for the entries corresponding to all the removed files, the inquiry processing program 111 returns to Step S8303 and executes similar processing (Steps S8303 to S8306).

In a case where it is determined that the processing is complete for the entries corresponding to all the removed files, the inquiry processing program 111 transmits the generated list 116 to the analysis program 61 which has transmitted the request to output the file list, and ends the processing (Steps S8307 and S8308).

Figure 16:
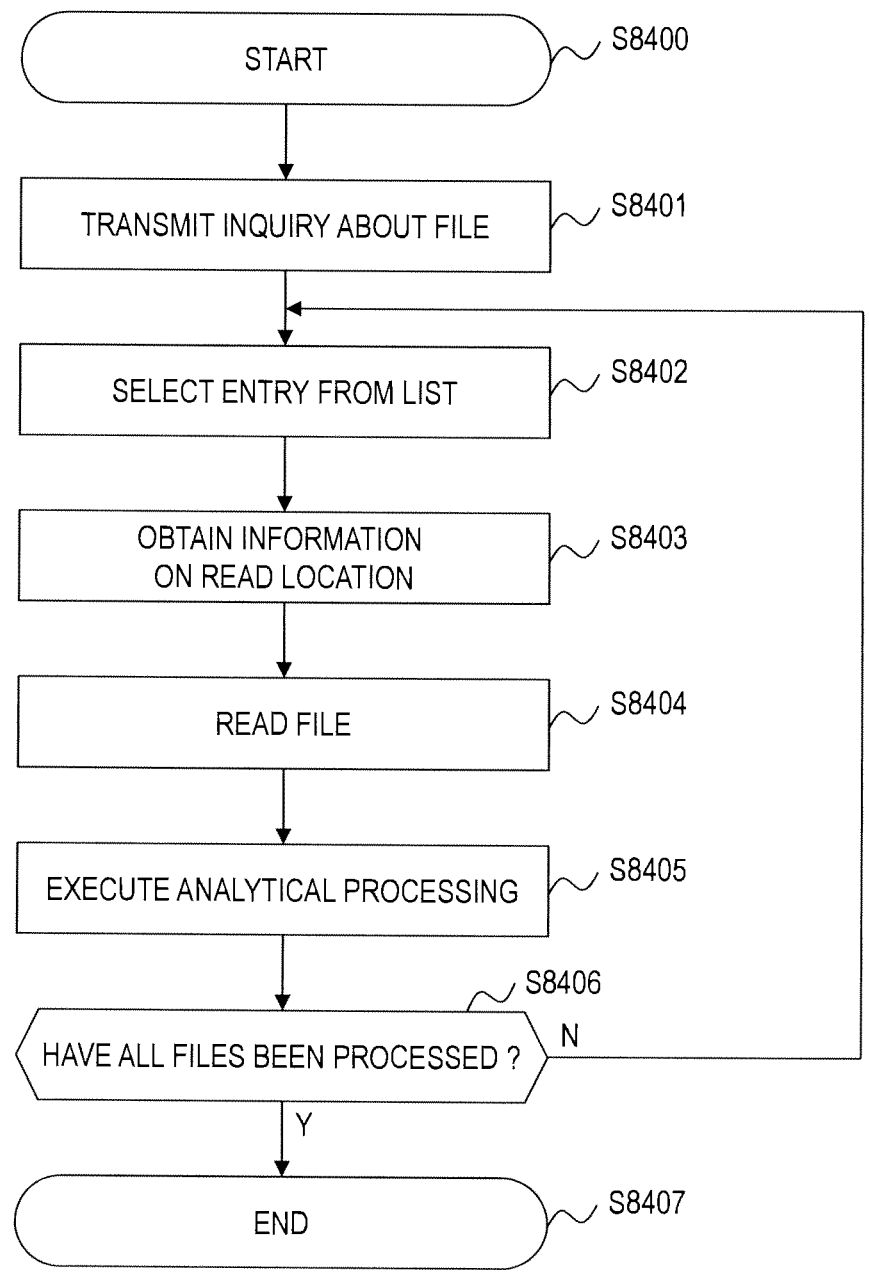
FIG. 16 is a flowchart illustrating the analytical processing on files executed by an analysis program according to the first embodiment of this invention.

FIG. 16 is a flowchart illustrating the analytical processing on files executed by the analysis program 61 according to the first embodiment of this invention.

The analysis program 61 executes the analytical processing periodically or in accordance with a user's instruction.

In a case where the analytical processing is started (Step S8400), the analysis program 61 transmits to the inquiry processing program 111 of the metadata server 1 an inquiry about files stored in all the file servers 4 (Step S8401). The output request may include conditions on the files to be included in the list 116.

The analysis program 61 waits for a response from the metadata server 1. In other words, the analysis program 61 suspends the processing until the list 116 is transmitted from the metadata server 1.

The analysis program 61 selects one entry to be processed from the received list 116 (Step S8402). For example, a method of selecting an entry in order from the top of the list 116 may be contemplated.

The analysis program 61 obtains, based on the entry to be processed, information on a read location of the file corresponding to the entry (Step S8403). To be specific, the following processing is executed.

First, the analysis program 61 determines whether or not "removed" is stored in the file status 1167 of the selected entry. In a case where "removed" is stored in the file status 1167, it can be seen that the selected entry is an entry on a removed file.

In a case where "removed" is stored in the file status 1167, the analysis program 61 obtains information stored in the save destination information 1168. In other words, the saved path 11681, the storage ID 11682, the IP address 11683, and the saved name space ID 11684 are obtained.

In a case where "removed" is stored in the file status 1167, the analysis program 61 obtains the path 1162, the storage ID 1164, the IP address 1165, and the name space ID 1166.

This concludes the processing of Step S8403.

Next, based on the information obtained in Step S8403, the analysis program 61 reads the file corresponding to the selected entry from the storage apparatus as the read location (Step S8404).

The analysis program 61 executes predetermined analytical processing based on the content of the read file and the original metadata 1163 of the selected entry (Step S8405).

The analysis program 61 determines whether or not the processing is complete for all the entries in the obtained list 116 (Step S8406).

In a case where it is determined that the processing is not complete for all the entries, the analysis program 61 returns to Step S8402 and executes similar processing (Steps S8402 to S8406).

In a case where it is determined that the processing is complete for all the entries, the analysis program 61 ends the analytical processing (Step S8407).

It should be noted that in Step S8404, the storage apparatus in which the file is stored may be a storage apparatus that cannot be accessed by the analysis program 61. This applies, for example, to a case where a file sharing protocol for reading the file is not supported in the analysis program 61.

In this case, the analysis program 61 transmits a read request for a desired file to the file read proxy program 115. In a case of receiving the request, the file read proxy program 115 reads the file from the storage apparatus as proxy for the analysis program 61, and responds to the analysis program 61 with the read file.

Second Embodiment

Next, a second embodiment of this invention is described.

In the first embodiment, in a case of receiving from the business program 51 the request to remove a file, the file server 4 transmits the removal notification of the file to the metadata server 1 in the course of the processing. Thereafter, the file server 4 executes the hiding processing in accordance with the instruction of the metadata server 1.

The second embodiment is different in that the file server 4 transmits removal notifications of a plurality of files to the metadata server 1 at one time, in a case where requests to remove a certain number of files are received from the business program 51 or in a case where a certain period of time has elapsed since the removal notification is transmitted. Moreover, in the second embodiment, in order to transmit the removal notifications of the plurality of files at one time, in a case where a request to remove a file is received, the file server 4 automatically executes the hiding processing on the file without waiting for an instruction from the metadata server 1.

In the following, differences from the first embodiment are mainly described.

The components of the computer system 500, the components of the metadata server 1, and the tables managed by the metadata server 1 in the second embodiment are the same as those of the first embodiment, and hence descriptions thereof are omitted. The file server 4 in the second embodiment is different from the file server 4 in the first embodiment in that the memory 41 newly includes a hidden file management table 415 (not shown). The other components are the same as those of the first embodiment, and hence descriptions thereof are omitted.

FIG. 17 is an explanatory diagram illustrating an example of a configuration of the hidden file management table 415 according to the second embodiment of this invention.

The hidden file management table 415 stores information on hidden files. To be specific, the hidden file management table 415 includes a path 4151, a name space ID 4152, original metadata 4153, and a hidden file path 4154.

The path 4151 stores the path name of the file before the hiding processing is executed. The name space ID 4152 stores the identification name of the name space in which the file was stored before the hiding processing is executed.

The original metadata 4153 stores the metadata of the file before the hiding processing is executed. The hidden file path 4154 stores the path name of the hidden file.

Figure 18:
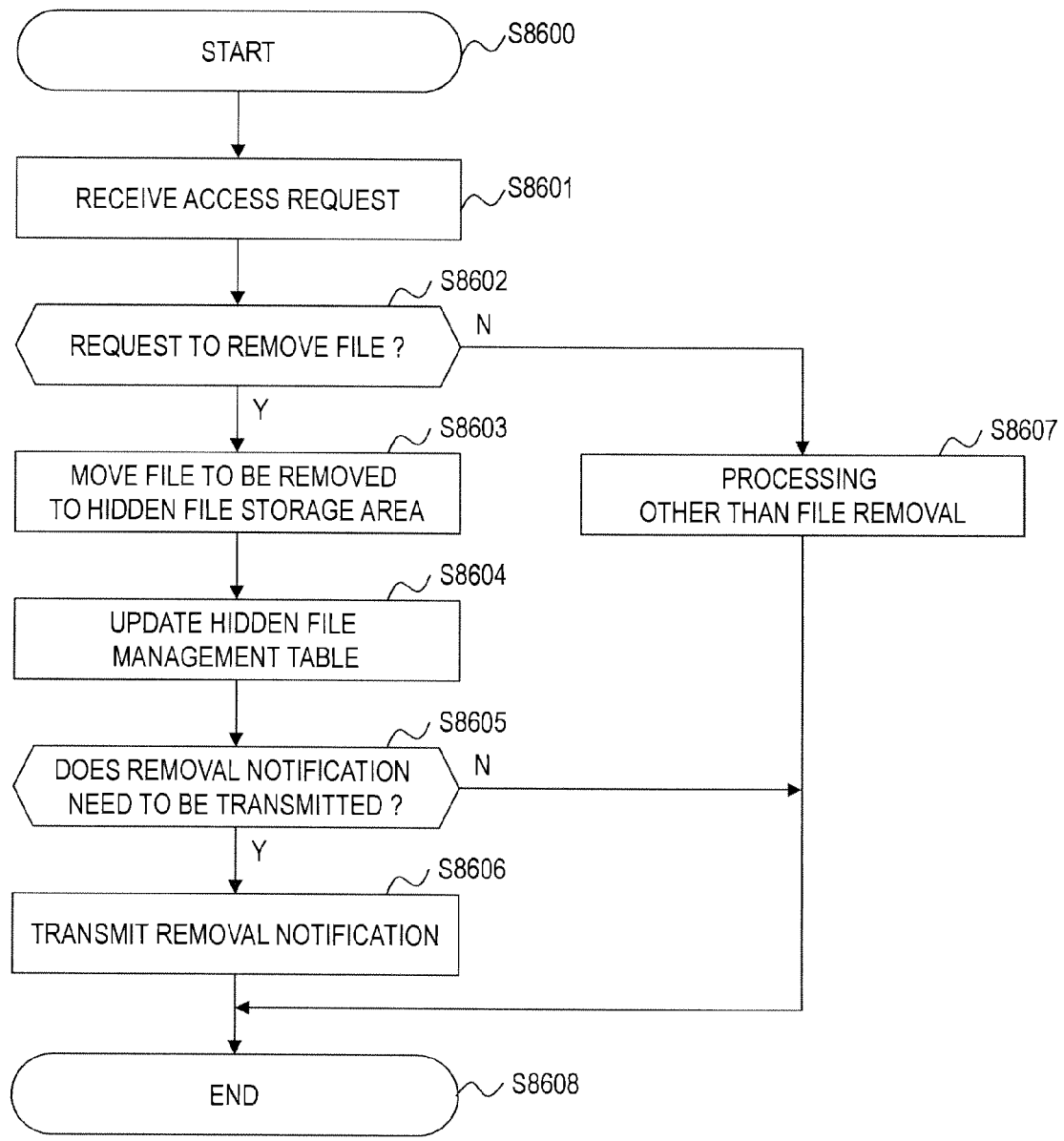
FIG. 18 is a flowchart illustrating processing executed by the file sharing program according to the second embodiment of this invention.

FIG. 18 is a flowchart illustrating processing executed by the file sharing program 411 according to the second embodiment of this invention.

In a case where the processing is started (Step S8600), the file sharing program 411 receives an access request to a predetermined file from the business program 51 or another program via the network 7 (Step S8601).

The file sharing program 411 determines whether or not the received access request is a request to remove the file (Step S8602).

In a case where it is determined that the received access request is not the request to remove the file, the file sharing program 411 instructs the file system program 412 to execute processing in accordance with the received access request (Step S8607). Thereafter, the file sharing program 411 transmits a response to the program that has transmitted the access request, and ends the processing (Step S8608).

In a case where it is determined that the received access request is the request to remove the file, the file sharing program 411 moves the file to be removed to the hidden file storage area 454 (Step S8603). As a result, the file to be removed is recognized by the business program 51 as having been removed.

The file sharing program 411 updates the hidden file management table 415 (Step S8604). In other words, the file sharing program 411 stores the information on the hidden file in the hidden file management table 415.

To be specific, the file sharing program 411 generates a new record, and stores in the generated record the path name, the identification name of the name space, and the metadata under which the file to be removed was stored before being moved to the hidden file storage area 454, and the path name of the hidden file. The path name of the hidden file is determined by the file sharing program 411 so as not to overlap in the hidden file management table 415.

The file sharing program 411 determines whether or not the removal notification of the file needs to be transmitted to the metadata server 1 (Step S8605). For example, in a case where a preset certain number of records or more are registered with the hidden file management table 415, or in a case where a preset period of time has elapsed from the last removal notification, the file sharing program 411 determines that the removal notification of the file needs to be transmitted.

In a case where it is determined that the removal notification of the file does not need to be transmitted to the metadata server 1, the file sharing program 411 ends the processing (Step S8608).

In a case where it is determined that the removal notification of the file needs to be transmitted to the metadata server 1, the file sharing program 411 transmits the removal notification of the file to the metadata server 1 (Step S8606). The notification includes information on all records stored in the hidden file management table 415, that is, information on all hidden files. Thereafter, the file sharing program 411 ends the processing (Step S8608).

It should be noted that the processing of Steps S8605 and S8606 is executed in the course of the processing in response to the access request from the business program 51, but the two processing steps may be periodically executed as processing independent of the processing in response to the access request.

In a case of receiving the removal notification from the file sharing program 411, the file removal detection program 113 executes the processing illustrated in FIG. 11. It should be noted, however, that when the removal notification is received, the removed file is hidden by the file server 4, and hence the processing of Step S8203 is not executed.

Third Embodiment

Next, a third embodiment of this invention is described.

The third embodiment has a feature in that the second embodiment is extended to manage, in addition to the removed file, data to be partially erased from a file due to overwrite on the file, a change in size of the file, or the like so as to be readable by the analysis program 61.

The data to be erased due to removal of the file, the overwrite on the file, or truncation of the file size is hereinafter referred to as erased data.

Moreover, a file that cannot be read from the file server 4 because the erased data is generated by the above-mentioned processing but can be obtained by inquiring of the metadata server 1 is referred to as the removed file. In particular, the file from which a part of data is erased due to the overwrite on the file or the truncation of the file size is referred to as a partially erased file.

Moreover, the file on the file server 4 in which the erased data was stored is referred to as an original file. A file for saving the erased data is referred to as a saved file. One saved file stores erased data generated in processing of one access.

In the following, differences from the first embodiment and the second embodiment are mainly described.

The components of the computer system 500 and the components of the metadata server 1 in the third embodiment are the same as those of the first embodiment, and hence descriptions thereof are omitted. Moreover, the components of the file server 4 in the third embodiment are the same as those of the second embodiment, and hence descriptions thereof are omitted.

The third embodiment is different in the saved file management table 154 included in the metadata server 1 and the hidden file management table 415 included in the file server 4.

FIG. 19 is an explanatory diagram illustrating an example of a configuration of the saved file management table 154 according to the third embodiment of this invention.

The saved file management table 154 in the third embodiment is stored in the memory 11 of the metadata server 1.

The saved file management table 154 stores information for managing correspondences between the erased data and the saved file. To be specific, the saved file management table 154 includes one or more records, and each of the records includes the metadata ID 1541, the saved path 1542, the saved name space ID 1543, and an address range 1544.

Each record of the saved file management table 154 corresponds to information on the erased data generated in the processing of one access.

As compared to the saved file management table 154 in the first embodiment, the address range 1544 is newly added. The address range 1544 stores the address range of the erased data on the original file, the erased data was stored in the original file.

In a case of detecting that data has been erased in the file server 4, the metadata server 1 moves the erased data to the saved file and updates the saved file management table 154.

In the example illustrated in FIG. 19, the first record stores information on erased data in the file "/share1/b.doc". The metadata ID 1541 stores the identifier "110" of the metadata corresponding to the file "/share1/b.doc". Moreover, the saved path 1542 stores the path name "/r/FS1/share1/b.doc" of the location of the saved file. The saved name space ID 1543 stores the identifier "n3001" of the name space in which the saved file "/r/FS1/share1/b.doc" is stored. Further, the address range 1544 stores an address range [10,20) of the erased data in the original file "/share1/b.doc".

FIG. 20 is an explanatory diagram illustrating an example of a configuration of the hidden file management table 415 according to the third embodiment of this invention.

The hidden file management table 415 in the third embodiment is stored in the memory 41 of the file server 4.

The hidden file management table 415 stores information for managing correspondences between the erased data and the hidden file. To be specific, the hidden file management table 415 includes one or more records, and each of the records includes the path 4151, the name space ID 4152, the original metadata 4153, the hidden file path 4154, an address range 4155, and an erasure type 4156.

Each record of the hidden file management table 415 corresponds to information on the erased data generated in the processing of one access.

As compared to the second embodiment, the address range 4155 and the erasure type 4156 are newly added. The address range 4155 stores the address range of the erased data on the original file in which the erased data was stored. The erasure type 4156 stores a reason why the erased data was generated.

In a case where the erased data was generated because the file was removed, the erasure type 4156 stores "removed", which is information indicating that the file was removed. In a case where the erased data was generated due to the overwrite in a part of the file or the truncation of the file size, the erasure type 4156 stores "partially erased", which is information indicating that a part of data of the file was erased.

In a case where the erased data is generated, that is, in a case of processing such as the removal of the file, the overwrite on the file, or the truncation of the file size is requested, the file server 4 reads the erased data from the original file to write the erased data in the hidden file, and updates the hidden file management table 415.

Figure 21:
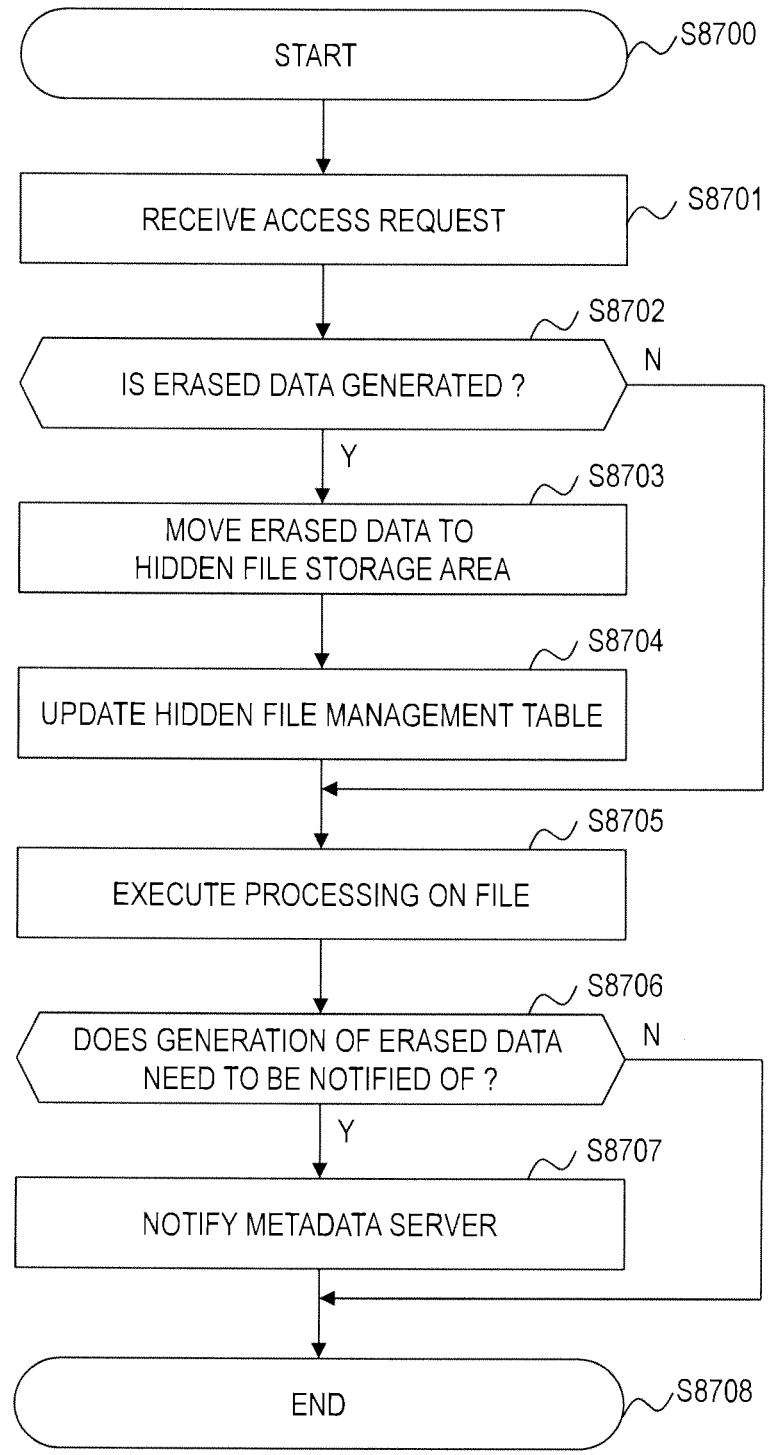
FIG. 21 is a flowchart illustrating processing executed by the file sharing program according to the third embodiment of this invention.

FIG. 21 is a flowchart illustrating processing executed by the file sharing program 411 according to the third embodiment of this invention.

The third embodiment is different from the second embodiment in that not only when the removal of the file is requested but also when the erased data is generated due to the overwrite on the file or the truncation of the file size, the erased data is stored in the hidden file storage area 454.

As in the second embodiment, in a case where the processing is started (Step S8700), the file sharing program 411 receives an access request to a file from the business program 51 or another program via the network 7 (Step S8701).

The file sharing program 411 determines whether or not the erased data is generated, in a case where processing corresponding to the received access request is executed (Step S8702). In other words, it is determined whether or not the received access request requests the erasure of data from the file. For example, in a case where the received access request is a request for the removal of the file, the overwrite on the file, the truncation of the file size, or the like, it is determined that the erased data is generated, in a case where the processing corresponding to the received access request is executed.

In a case where it is determined that the erased data is not generated, the file sharing program 411 proceeds to Step S8705.

In a case where it is determined that the erased data is generated, the file sharing program 411 moves the erased data to the hidden file storage area 454 (Step S8703).

To be specific, the file sharing program 411 identifies the address range of the erased data, generates a hidden file for storing the erased data in the hidden file storage area 454, and stores the erased data in the generated hidden file.

At this time, a path name of the hidden file is determined so as not to overlap with the other hidden files stored in the hidden file storage area 454.

The file sharing program 411 updates the hidden file management table 415 based on information on the generated hidden file (Step S8704).

To be specific, the file sharing program 411 adds a new record to the hidden file management table 415.

The file sharing program 411 stores the path name of the original file in the path 4151 of the added record, stores in the name space ID 4152 an identifier of a name space in which the original file is stored, and stores the metadata of the original file in the original metadata 4153.

Moreover, the file sharing program 411 stores the path name of the generated hidden file in the hidden file path 4154, and stores the address range of the erased data in the address range 4155. Further, the file sharing program 411 stores in the erasure type 4156 "removed" when the file is removed, and "partially erased" when the file is not removed.

Next, the file sharing program 411 executes the processing corresponding to the received access request on the file (Step S8705).

The file sharing program 411 determines whether or not the removal notification needs to be transmitted (Step S8706). It should be noted that the removal notification also includes a notification that the access request that generates the erased data has been received.

For example, in a case where a preset certain number of records or more are registered with the hidden file management table 415 or in a case where a preset period of time has elapsed from the last removal notification, it is determined that the removal notification needs to be transmitted.

In a case where it is determined that the removal notification, that is, the notification that the erased data has been generated does not need to be transmitted to the metadata server 1, the file sharing program 411 ends the processing (Step S8708).

In a case where it is determined that the removal notification needs to be transmitted, that is, the generation of the erased data needs to be notified to the metadata server 1, the file sharing program 411 notifies the metadata server 1 of the generation of the erased data (Step S8707). The notification includes information on all the records stored in the hidden file management table 415, that is, information on all the hidden files. Thereafter, the file sharing program 411 ends the processing (Step S8708).

It should be noted that the processing of Steps 8706 and S8707 is executed in the course of the processing in response to the access request, but may be periodically executed as processing independent of the processing in response to the access request.

Figure 22:
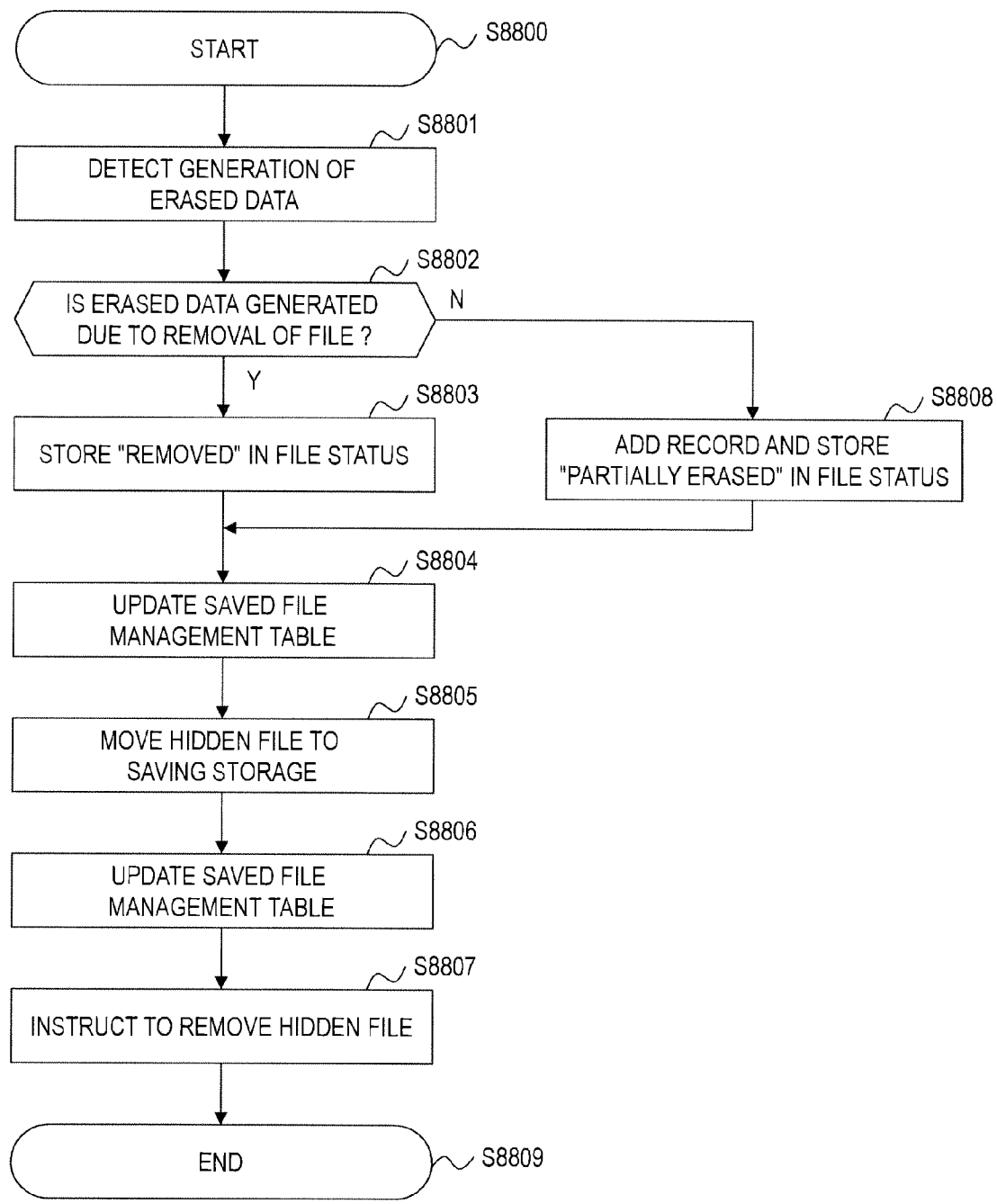
FIG. 22 is a flowchart illustrating processing executed by the file removal detection program according to the third embodiment of this invention.

FIG. 22 is a flowchart illustrating processing executed by the file removal detection program 113 according to the third embodiment of this invention.

In a case where the processing is started (Step S8800), the file removal detection program 113 detects the generation of the erased data in the file server 4 (Step S8801).

To be specific, the file removal detection program 113 may detect that the erased data has been generated in the file server 4 by receiving the removal notification that the erased data has been generated from the file server 4. It should be noted that the removal notification includes the information stored in the hidden file management table 415.

The description is given here assuming that the file removal detection program 113 executes the processing for each piece of the erased data, that is, for each record of the hidden file management table 415.

The file removal detection program 113 determines, based on the hidden file management table 415 included in the received removal notification, whether or not the erased data to be processed is generated due to the removal of the file (Step S8802). In other words, it is determined whether the file that included the erased data to be processed is the removed file or the partially erased file.

In a case where "removed" is stored in the erasure type 4156, the file removal detection program 113 determines that the erased data was generated due to the removal of the file. On the other hand, in a case where "partially erased" is stored in the erasure type 4156, the file removal detection program 113 determines that the erased data was generated due to the overwrite on the file or the truncation of the file size.

In a case where it is determined that the erased data was generated due to the removal of the file, the file removal detection program 113 identifies a record of the metadata management table 153 corresponding to the file to be processed, and stores "removed" in the file status 1535 of the record (Step S8803). Thereafter, the file removal detection program 113 proceeds to Step S8804.

In a case where it is determined that the erased data was not generated due to the removal of the file, the file removal detection program 113 adds a record corresponding to the file to be processed to the metadata management table 153 (Step S8808).

To be specific, the file removal detection program 113 stores an identifier that does not overlap with the other records in the metadata ID 1531 of the added record. The file removal detection program 113 stores the path name and the metadata of the file to be processed in the path 1532 and the original metadata 1534 of the added record, respectively. The file removal detection program 113 stores in the name space ID 1533 an identifier of a name space in which the file to be processed is stored. Moreover, the file removal detection program 113 stores "partially erased" in the file status 1535.

It should be noted that the information to be stored in the added record may be obtained based on the information included in the removal notification received from the file server 4.

The file removal detection program 113 updates the saved file management table 154 (Step S8804). To be specific, the file removal detection program 113 adds a record corresponding to the hidden file in which the erased data to be processed is stored.

The added record stores in the metadata ID 1541 the same identifier as the metadata ID 1531 of the record identified in Step S8804 or the metadata ID 1531 of the record added in Step S8808. The saved path 1542 stores the path name of the hidden file, the saved name space ID 1543 stores an identifier of a name space in which the hidden file is stored, and the address range 1544 stores the address range of the erased data stored in the hidden file. It should be noted that the information to be stored in the added record may be obtained based on the information included in the removal notification received from the file server 4.

The file removal detection program 113 moves the hidden file to the saving storage apparatus 2 (Step S8805). To be specific, the file removal detection program 113 copies the hidden file in the name space of the saving storage apparatus 2 to move the erased data to be processed to the saved file. At this time, the path name of the saved file is determined so as not to overlap with the other saved files stored in the saving storage apparatus 2.

The file removal detection program 113 updates the saved file management table 154 (Step S8806). To be specific, the file removal detection program 113 changes the saved path 1542 of the record added in Step S8804 to the path name of the saved file.

The file removal detection program 113 instructs the file server 4 to remove the hidden file (Step S8807). Thereafter, the file removal detection program 113 ends the processing (Step S8809).

FIGS. 23 and 24 are explanatory diagrams each illustrating an example of the metadata management table 153 according to the third embodiment of this invention. FIG. 25 is an explanatory diagram illustrating an example of the saved file management table 154 according to the third embodiment of this invention.

A description is given here of the metadata management table 153 and the saved file management table 154 in a case where data is overwritten on the file "/share1/a.doc" stored in the name space "share1" of the file server 4.

FIG. 23 represents the metadata management table 153 before the data is overwritten on the file "/share1/a.doc". In the first record of the metadata management table 153, information on the file "/share1/a.doc" is recorded. It can be seen from the information stored in the record that the file "/share1/a.doc" is stored in the file server 4 and a modified time thereof is "10:00".

FIG. 24 represents the metadata management table 153 after the data is overwritten on the file "/share1/a.doc" and the metadata server 1 has moved the erased data to the saving storage apparatus 2.

When compared to FIG. 23, the second record having the metadata ID 1531 of "101" is added. The record represents that the metadata server 1 manages the file "/share1/a.doc" at the modified time of "10:00" as the partially erased file. Therefore, the file status 1535 of the record stores "partially erased".

Moreover, it can be seen that in the first record, the modified time is changed to "12:00" due to the overwrite of the data on the file "/share1/a.doc".

FIG. 25 represents the saved file management table 154 after the data is overwritten on the file "/share1/a.doc" and the metadata server 1 has moved the erased data to the saving storage apparatus 2.

The first record of the saved file management table 154 of FIG. 25 stores information on the erased data and the saved file of the partially erased file corresponding to the second record of the metadata management table 153 of FIG. 24.

The metadata ID 1541 of the second record stores "100". Therefore, it can be seen that the second record is a record relating to the erased data of the partially erased file corresponding to the second record of the metadata management table 153 of FIG. 24.

It can be seen from the saved path 1542 and the saved name space ID 1543 that the erased data is stored in the name space "r" of the saving storage apparatus 2 as a file having the path name of "A/r/s1000/share/a.doc_diff".

It can also be seen from the address range 1544 that the erased data is data that was stored in the range of addresses "0" to "29" of the original file.

Figure 26:
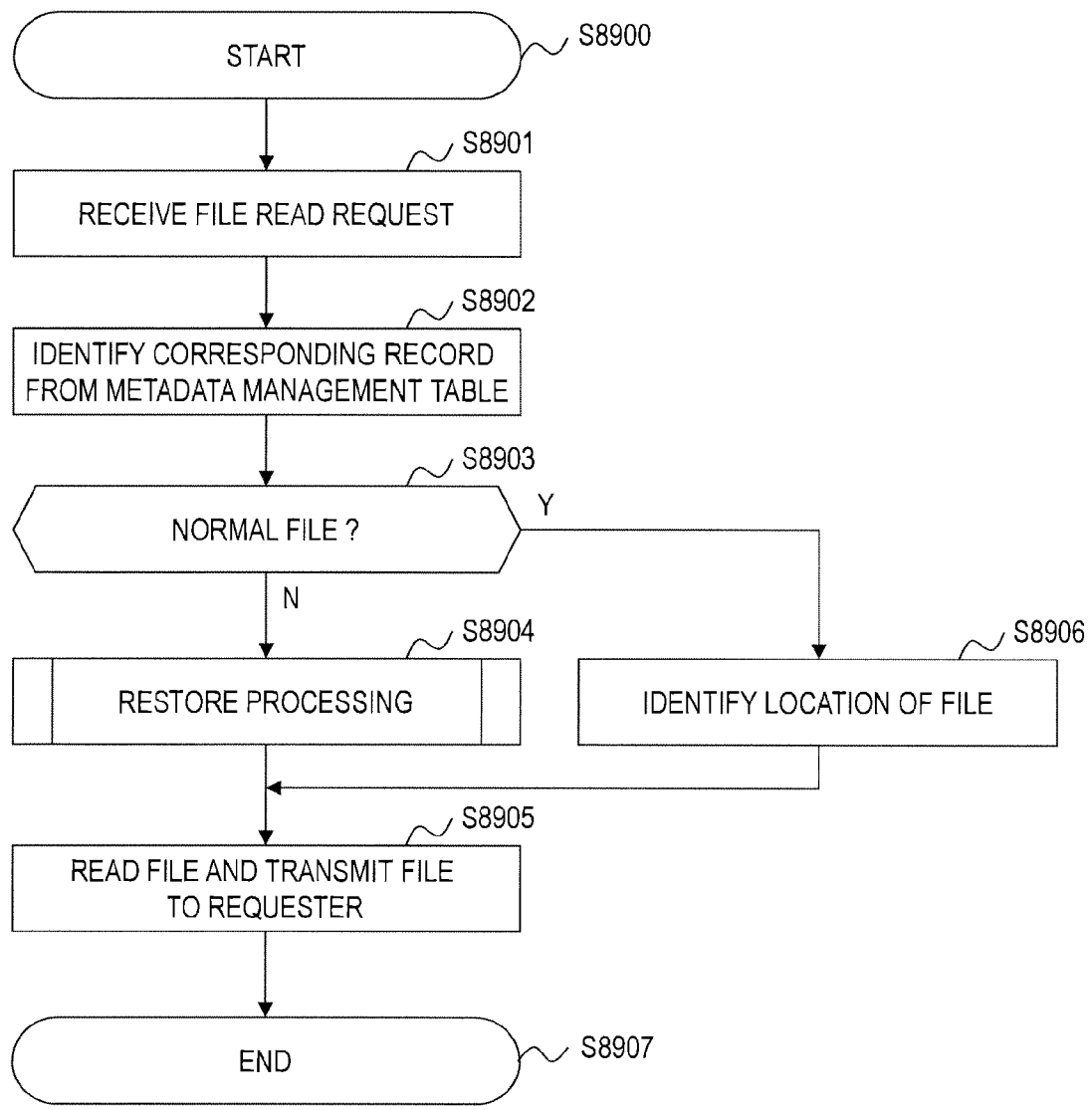
FIG. 26 is a flowchart illustrating processing executed by a file read proxy program according to the third embodiment of this invention.

FIG. 26 is a flowchart illustrating processing executed by the file read proxy program 115 according to the third embodiment of this invention.

The file read proxy program 115 according to this embodiment receives a read request for the normal file, the removed file, or the partially erased file and responds to the requester with a content of the file. In a case where the requested file is the removed file or the partially erased file, the requested file is temporarily restored to respond with the content of the restored file.

In a case where the processing is started (Step S8900), the file read proxy program 115 receives a file read request from the analysis program 61 or the like (Step S8901). The received file read request includes information for the requester program to specify the file. For example, information such as the path name, the name space name, the metadata, or another identifier (metadata ID or i-node number in the file system) of the file is included.

The file read proxy program 115 identifies a corresponding record of the metadata management table 153 based on the information included in the received file read request (Step 8902).

The file read proxy program 115 refers to the file status 1535 of the identified record to determine whether or not the file to be read is the normal file (Step S8903).

In a case where the file status 1535 is "removed" or "partially erased", it is determined that the file to be read is the removed file or the partially erased file. On the other hand, in a case where the file status 1535 is "present", it is determined that the file to be read is the normal file.

In a case where it is determined that the file to be read is not the normal file but is any one of the removed file and the partially erased file, the file read proxy program 115 executes restoration processing for restoring the file to be read (Step S8904). As a result, the file is temporarily restored in the saving storage apparatus 2. It should be noted that details of the restoration processing are described later with reference to FIG. 27.

Thereafter, the file read proxy program 115 transmits the restored file to the requester, and ends the processing (Steps S8905 and S8907).

In a case where it is determined in Step S8903 that the file to be read is the normal file, the file read proxy program 115 identifies the location of the file to be read (Step S8906). To be specific, the location of the file is identified based on the identifier of the file server 4, the identifier of the name space, the path name, and the like.

Further, the file read proxy program 115 reads the file to be read from the file server 4 as the identified location to transmit the read file to the requester, and ends the processing (Steps S8905 and S8907).

Figure 27:
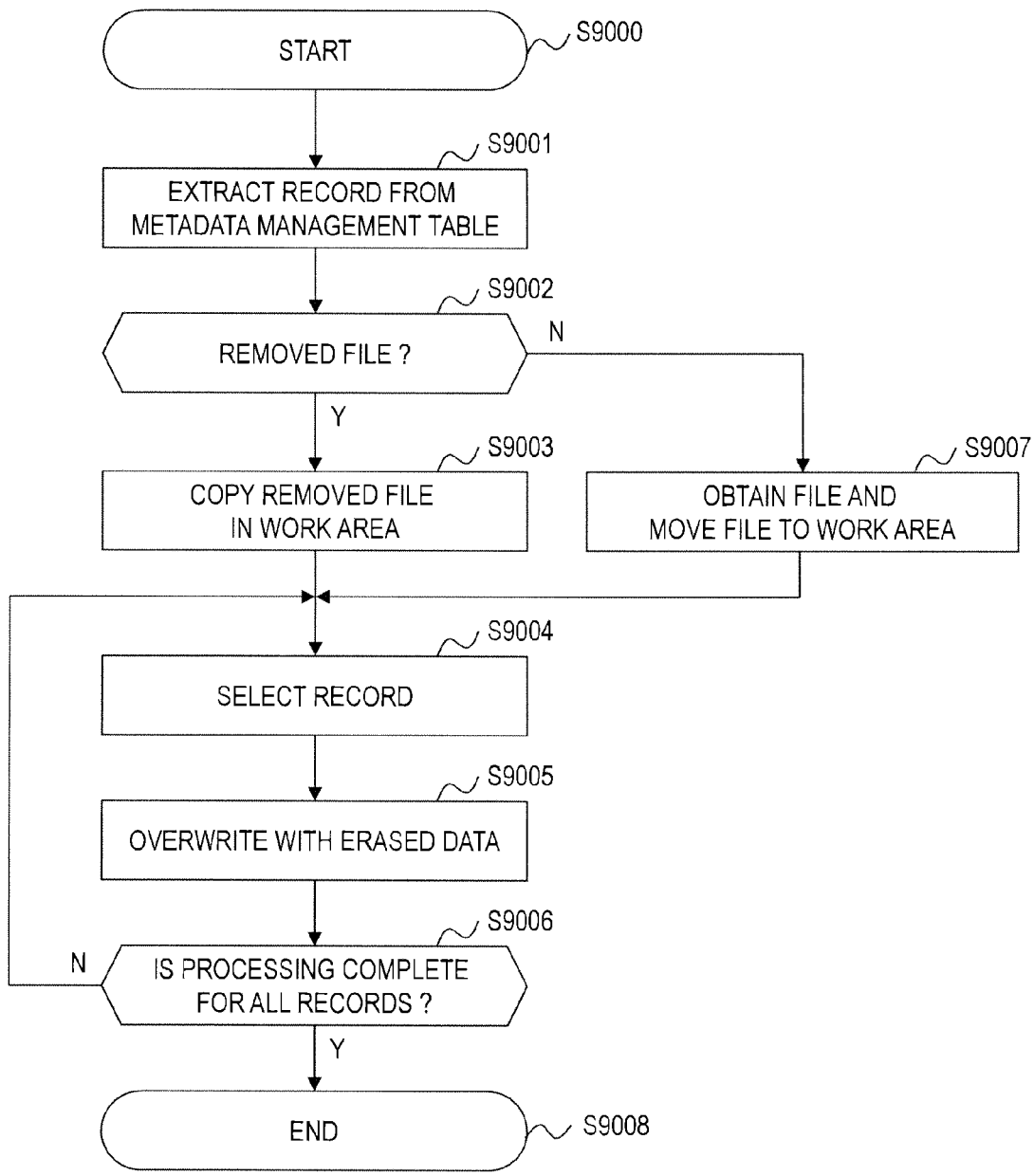
FIG. 27 is a flowchart illustrating the details of a restoration processing according to the third embodiment of this invention.

FIG. 27 is a flowchart illustrating the details of the restoration processing according to the third embodiment of this invention.

In a case where the processing is started (Step S9000), the file read proxy program 115 extracts records relating to the file to be read from the metadata management table 153 (Step S9001). In this example, records of the same file to be read that are newer in time series than the record identified in Step S8903 are extracted.

To be specific, the file read proxy program 115 extracts records each having the path 1532 and the name space ID 1533 that match those of the file to be read and having a modified time included in the original metadata 1534 that is later than the modified time of the file to be read, that is, having a newer modified time.

The file read proxy program 115 determines whether or not the file to be read is currently the removed file (Step S9002). To be specific, of the extracted records, the file read proxy program 115 identifies a record for which a modified time stored in the original metadata 1534 is the latest, and determines whether or not the file status 1535 of the record is "removed".

In a case where it is determined that the file to be read is currently the removed file, the file read proxy program 115 copies, based on the record of the removed file extracted in Step S9001, the removed file as a temporary file in a work area (Step S9003). The work area as used herein is one storage space of the saving storage apparatus 2.

On the other hand, in a case where it is determined that the file to be read is not currently the removed file but is the partially erased file, the file read proxy program 115 reads, based on the records extracted in Step S9001, the file to be read that is currently stored in the file server 4, and copies the read file as a temporary file in the work area (Step S9007).

The file read proxy program 115 selects, from among the extracted records, a record having the next newer modified time than the record identified in Step S9003 as a record to be processed (Step S9004).

The file read proxy program 115 overwrites the temporary file with removed data stored in the saved file (Step S9005). To be specific, the following processing is executed.

The file read proxy program 115 identifies, based on the information in the record selected in Step S9004, a record of a corresponding saved file from the saved file management table 154.

The file read proxy program 115 reads the saved file from the saving storage apparatus 2 based on the identified record to obtain the removed data.

The file read proxy program 115 refers to the address range 1544 of the identified record to overwrite the same address range of the temporary file with the read removed data. Moreover, the file read proxy program 115 changes a file size of the temporary file to the file size stored in the original metadata 1534 of the selected record of the metadata management table 153.

Through the above-mentioned processing, the temporary file has the same content as the file at a time when the record selected in Step S9004 is added to the metadata management table 153.

The file read proxy program 115 determines whether or not the processing is complete for all the records extracted in Step 9001 (Step S9006).

In a case where it is determined that the processing is not complete for all the records extracted in Step 9001, the file read proxy program 115 returns to Step S9004 and executes similar processing (Steps S9004 to S9006).

In a case where it is determined that the processing is not complete for all the records extracted in Step 9001, the file read proxy program 115 ends the processing (Step S9008).

It should be noted that in the third embodiment, the metadata server 1 reads the file and transmits the read file to the analysis server 6. However, this invention is not limited thereto, and the analysis server 6 may obtain the file. In this case, the following processing is executed.

In Step S8905, the file read proxy program 115 generates the list 116 and transmits the generated list 116 to the analysis server 6. It should be noted that as the method of generating the list 116, the same method as in the first embodiment is used. It should be noted that the saved path 11681 of the record corresponding to the temporary file of the list 116 stores information on a location of the temporary file in the work area.

The analysis server 6 reads the files based on the received list 116. It should be noted that this processing is the same as in the first embodiment, and hence a description thereof is omitted.

In this embodiment, each piece of the erased data is stored in one saved file or hidden file, but this invention is not limited thereto. For example, the erased data may be stored collectively in several files, or stored in a database or block storage.

Fourth Embodiment

Next, a fourth embodiment of this invention is described.

The fourth embodiment extends the first embodiment, and in a case where a file having the same content as that of the removed file is stored in the backup storage apparatus 3, the saved file corresponding to the removed file is not generated. In this manner, the number of copied files having the same content may be reduced in the computer system 500.

In the following, differences from the first embodiment are mainly described.

The components of the computer system 500, and the components of the metadata server 1 and the file server 4 in the fourth embodiment are the same as those of the first embodiment, and hence descriptions thereof are omitted. Moreover, the configuration of each table managed by the metadata server 1 and the file server 4 is also the same as that of the first embodiment, and hence a description thereof is omitted.

Figure 28:
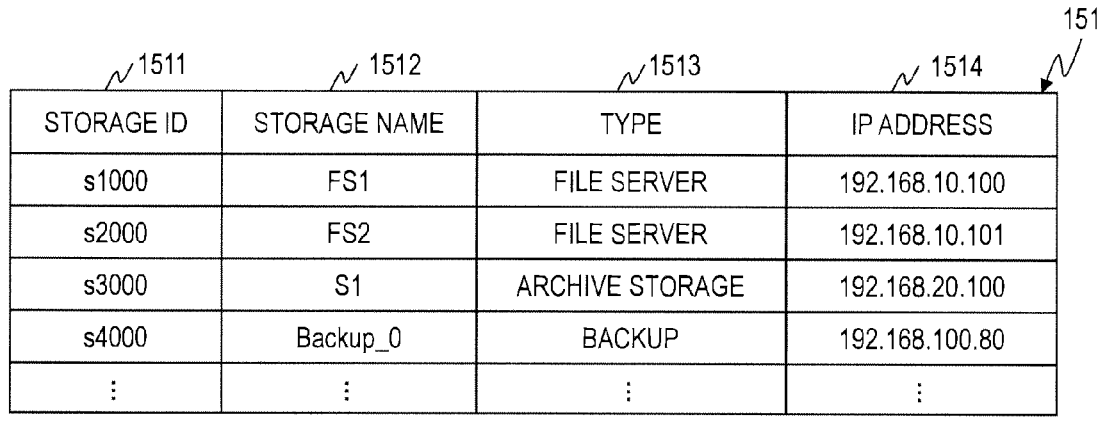
FIG. 28 is an explanatory diagram illustrating an example of a configuration of the storage management table according to a fourth embodiment of this invention.

FIG. 28 is an explanatory diagram illustrating an example of a configuration of the storage management table 151 according to the fourth embodiment of this invention.

The storage ID 1511, the storage name 1512, the type 1513, and the IP address 1514 are the same as those of the first embodiment, and hence descriptions thereof are omitted.

The fourth embodiment is different from the first embodiment in that the metadata server 1 also manages the backup storage apparatus 3 in addition to the file server 4 and the saving storage apparatus 2. In other words, the fourth record of the storage management table 151 illustrated in FIG. 28 stores information on a backup storage apparatus 3. It should be noted that the type 1513 of the record corresponding to the backup storage apparatus 3 stores "backup".

FIG. 29 is an explanatory diagram illustrating an example of a configuration of the name space management table 152 according to the fourth embodiment of this invention.

The name space ID 1521, the name space name 1522, the storage ID 1523, the capacity 1524, the protocol 1525, the used volume 1526, and the usage 1527 are the same as those of the first embodiment, and hence descriptions thereof are omitted.

As illustrated in FIG. 29, the fifth record of the name space management table 152 stores information on a name space in the backup storage apparatus 3. It should be noted that the usage 1527 of the record corresponding to the backup storage apparatus 3 stores "backup".

FIG. 30 is an explanatory diagram illustrating an example of a configuration of the metadata management table 153 according to the fourth embodiment of this invention.

In the fourth embodiment, the metadata management table 153 is stored in the memory 11 of the metadata server 1.

The metadata management table 153 in the fourth embodiment is different from the first embodiment in that a hash value 1536 is added. The hash value 1536 stores a hash value representing the content of the file corresponding to the entry. The hash value as used herein is a value obtained by applying a predefined hash function to the content of the file. For example, as the hash function, various known algorithms (for example, SHA256) may be used.

In this embodiment, it is determined whether or not the contents of the files are the same based on the hash value 1536.

In the example illustrated in FIG. 30, the fourth record of the metadata management table 153 stores information on a file "/BU/x.doc" stored in the backup storage apparatus 3. The file stored in the backup storage apparatus 3 is hereinafter referred to as a backup file.

Moreover, the file status 1535 of an entry corresponding to the backup file stores "BU", which represents that the file corresponding to the entry is the backup file. Moreover, it can be seen in the hash value 1536 of the record that a hash value calculated based on the file "/BU/x.doc" is "e001". It is assumed here that the hash value is a value represented in hexadecimal notation.

In order to store the information on the backup file in the metadata management table 153, the metadata management program 112 in this embodiment inquires of the backup program 31 of the backup storage apparatus 3 to obtain metadata of the backup file stored in the backup storage apparatus 3. Moreover, the metadata management program 112 may read a database or the like holding a list of backup files managed by the backup program 31.

The hash value of the backup file may be calculated by the metadata management program 112, in a case where the metadata management program 112 reads the backup file from the backup storage apparatus 3, or may be calculated by the backup program 31 and transmitted to the metadata management program 112.

Figure 31:
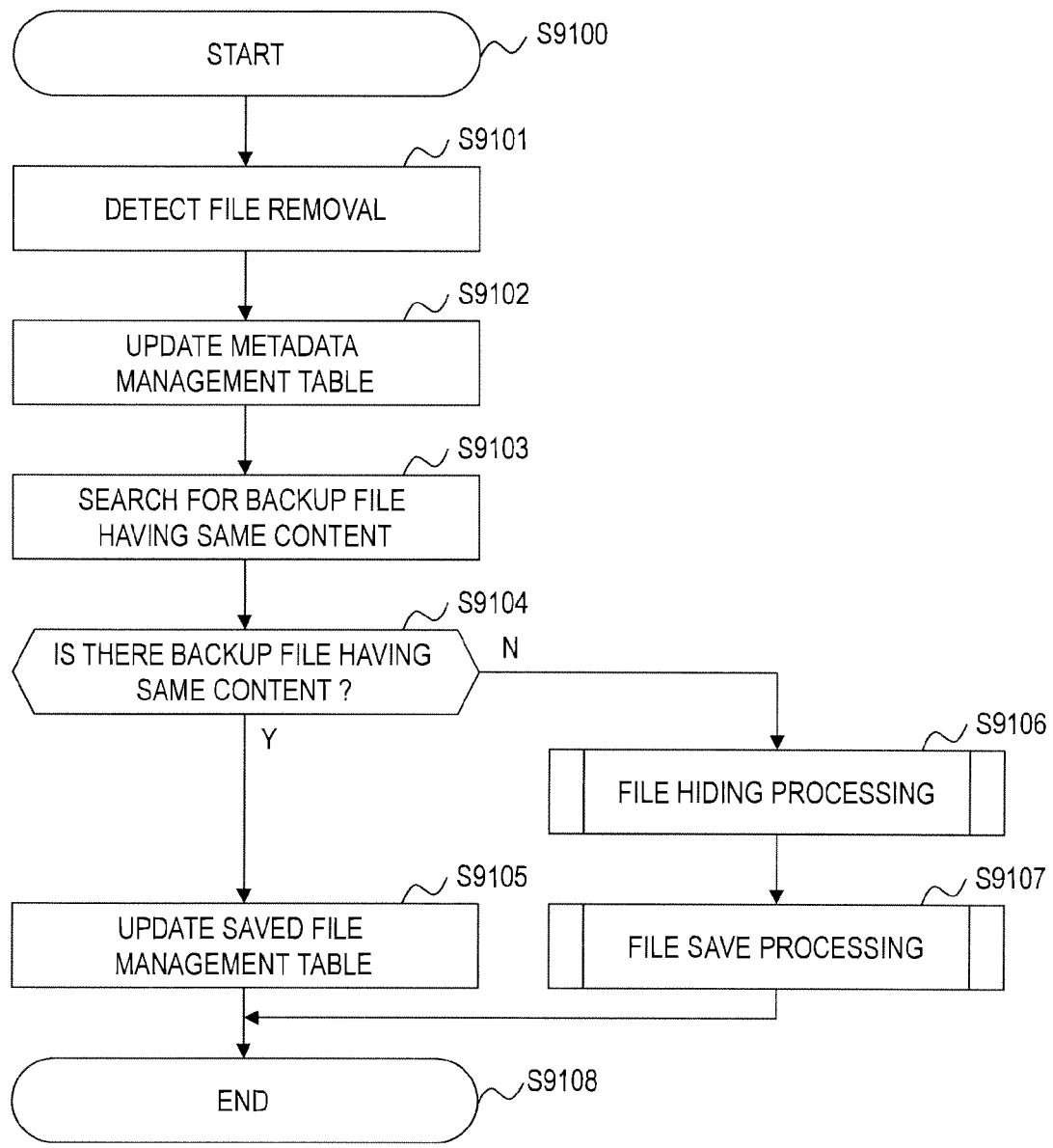
FIG. 31 is a flowchart illustrating processing executed by the file removal detection program according to the fourth embodiment of this invention.

FIG. 31 is a flowchart illustrating processing executed by the file removal detection program 113 according to the fourth embodiment of this invention.

In a case of detecting the file to be removed, the file removal detection program 113 in the fourth embodiment determines whether or not there is a backup file having the same content as that of the file. In a case where there is a backup file having the same content, the file removal detection program 113 adds the backup file as the saved file corresponding to the file to be removed to the saved file management table 154. Further, the file removal detection program 113 removes the file to be removed without generating the hidden file in the file server 4.

In a case where the processing is started (Step S9100), the file removal detection program 113 detects that a file is to be removed from the file server 4 (Step S9101).

The processing of Step S9101 is the same processing as Step S8201. It should be noted, however, that in the fourth embodiment, the removal notification transmitted from the file server 4 includes the hash value of the file to be removed.

It should be noted that the hash value of the file to be removed may be calculated by the file removal detection program 113 by applying the hash function to the file to be removed read from the file server 4.

The file removal detection program 113 updates a record corresponding to the file to be removed of the metadata management table 153 (Step S9102). The processing of Step S9202 is the same processing as Step S8202.

The file removal detection program 113 refers to the metadata management table 153 to search for a backup file having the same content as that of the file to be removed (Step S9103). To be specific, the following processing is executed.

The file removal detection program 113 obtains the hash value 1536 of the file to be removed.

Next, the file removal detection program 113 extracts an entry having "BU" stored in the file status 1535, and compares a hash value 1536 of the extracted entry and the hash value 1536 of the file to be removed. The entry matching the hash value 1536 of the file to be removed is the backup file having the same content as that of the file to be removed.

It should be noted that a method of determining the content of the file is not limited to the above-mentioned method. For example, a method of comparing the metadata of the files, a method of comparing file sizes, a method combining those methods, or the like may be used.

As a result of the search processing described above, the file removal detection program 113 determines whether or not there is a backup file having the same content as that of the file to be removed (Step S9104).

In a case where it is determined that there is no backup file having the same content as that of the file to be removed, the file removal detection program 113 executes the file hiding processing on the file to be removed with respect to the file server 4 (Step S9106).

Further, the file removal detection program 113 instructs the file server 4 that has provided the notification of the removal of the file to execute the hiding processing of the file to be removed (Step S9107), and ends the processing (Step S9108).

It should be noted that the processing of Steps S9106 and S9107 is the same processing as Steps S8203 and S8204, and hence a description thereof is omitted.

In a case where it is determined in Step S9104 that there is a backup file having the same content as that of the file to be removed, the file removal detection program 113 updates the saved file management table 154 and ends the processing (Steps S9105 and S9108).

To be specific, the file removal detection program 113 adds the information on the backup file as information on the saved file corresponding to the file to be removed to the saved file management table 154.

In other words, a value of the metadata ID 1531 of a record corresponding to the backup file is stored in the metadata ID 1541, and the path name of the path 1532 of the record corresponding to the backup file is stored in the saved path 1542. Moreover, an identifier of the name space ID 1533 of the record corresponding to the backup file is stored in the saved name space ID 1543.

In the above-mentioned processing, the files stored in the backup storage apparatus 3 are searched for the file having the same content as that of the file to be removed, but in addition thereto, all the storage apparatus managed by the metadata server 1 may be searched.

Fifth Embodiment

Next, a fifth embodiment of this invention is described. In the fifth embodiment, the file server 4 does not transmit the removal notification of the file to the metadata server 1, in a case where removal of a file is requested from the business program 51. Therefore, the metadata server 1 periodically determines whether or not a file has been removed from the file server 4. For the determination, a snapshot function of the file server 4 is used.

In the following, differences from the first embodiment are mainly described.

The components of the computer system 500, and the components of the metadata server 1 and the file server 4 in the fifth embodiment are the same as those of the first embodiment, and hence descriptions thereof are omitted. It should be noted that the fifth embodiment is different in that the file server 4 has the snapshot function. Moreover, the configuration of each table managed by the metadata server 1 and the file server 4 is also the same as that of the first embodiment, and hence a description thereof is omitted.

Figure 32A:
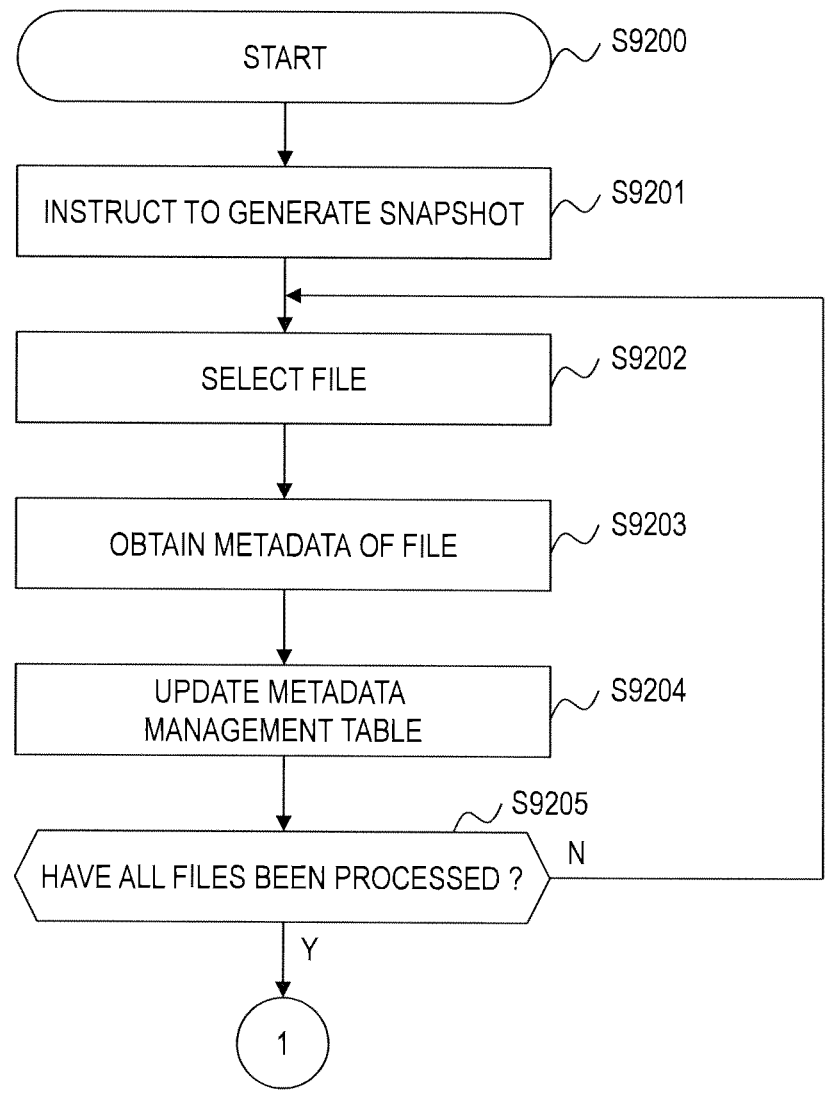
FIGS. 32A and 32B are flowcharts illustrating processing executed by the metadata management program according to a fifth embodiment of this invention.
Figure 32B:
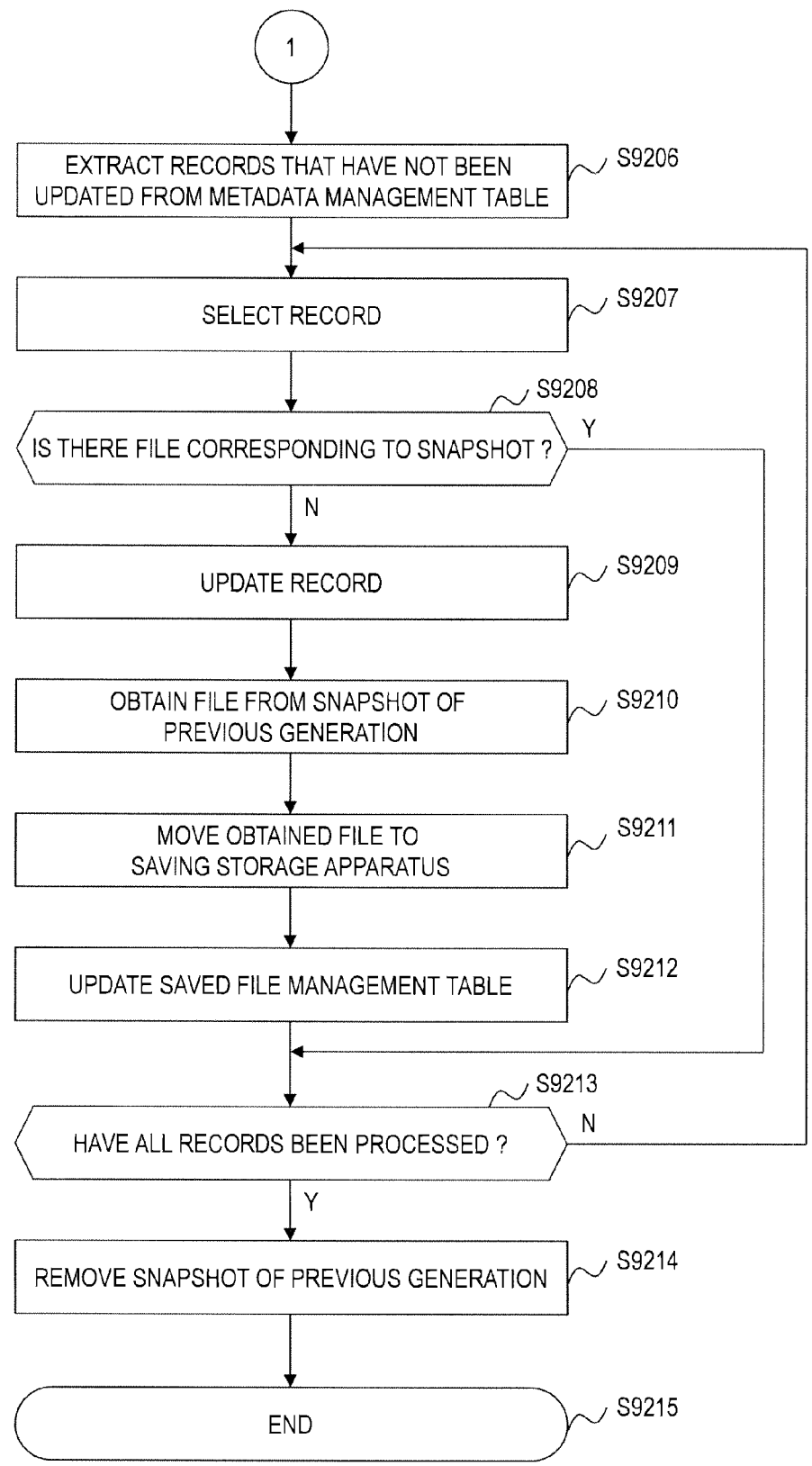

FIGS. 32A and 32B are flowcharts illustrating processing executed by the metadata management program 112 according to the fifth embodiment of this invention.

In this embodiment, the metadata management program 112 collects the metadata of the files stored in the file server 4, and detects a file removed from the file server 4 and moves the file to the saving storage apparatus 2.

In a case where the processing is started (Step S9200), the metadata management program 112 instructs the file server 4 to generate a snapshot of the name space from which the metadata is to be collected (Step S9201). In a case of receiving the instruction, the file server 4 generates the snapshot of the specified name space.

The metadata management program 112 selects one file to be processed from among files included in the generated snapshot (Step S9202). The processing of Step 9202 is different from the processing of Step S8002 (see FIG. 9) in that a file included in the snapshot is selected.

The metadata management program 112 obtains metadata of the selected file from the file server 4 (Step S9203).

The metadata management program 112 updates the metadata management table 153 based on the obtained metadata (Step S9204). The processing of Step S9204 is the same processing as the processing of Step S8004 (see FIG. 9).

The metadata management program 112 determines whether or not the processing is complete for all the files included in the snapshot (Step S9205).

In a case where it is determined that the processing is not complete for all the files included in the snapshot, the metadata management program 112 returns to Step S9202 and executes similar processing (Steps S9202 to S9205).

In a case where it is determined that the processing is complete for all the files included in the snapshot, the metadata management program 112 extracts, from among the records of the metadata management table 153, records that have not been updated in the processing of Steps S9201 to S9205 (Step S9206).

The metadata management program 112 selects one record to be processed from among the extracted records (Step S9207).

The metadata management program 112 determines whether or not a file corresponding to the record to be processed is included in the snapshot (Step S9208).

In a case where it is determined that the file corresponding to the record to be processed is included in the snapshot, the metadata management program 112 proceeds to Step S9212.

In a case where it is determined that the file corresponding to the record to be processed is not included in the snapshot, the metadata management program 112 updates the record to be processed (Step S9209). To be specific, the metadata management program 112 stores "removed" in the file status 1535 of the record to be processed.

This indicates that the file corresponding to the record to be processed is a file that has been removed before the snapshot is generated. Therefore, the file is managed as a removed file.

The metadata management program 112 obtains the file corresponding to the record to be processed from the snapshot of the previous generation of the snapshot generated in Step S9201 (Step S9210). The snapshot of the previous generation is generated in this processing executed last time. It should be noted that the snapshot of the previous generation may be stored in the file server 4 or in the saving storage apparatus 2.

The metadata management program 112 moves the file obtained from the snapshot of the previous generation as the saved file of the removed file corresponding to the record to be processed to the saving storage apparatus 2 (Step S9211).

The metadata management program 112 updates the saved file management table 154 (Step S9212). The processing of Step S9212 is the same processing as the processing of Step S8208 (see FIG. 11C).

The metadata management program 112 determines whether or not the processing is complete for all the records extracted in Step S9206 (Step S9213).

In a case where it is determined that the processing is not complete for all the records extracted in Step S9206, the metadata management program 112 returns to Step S9207 and executes similar processing (Steps S9207 to S9213).

In a case where it is determined that the processing is complete for all the records extracted in Step S9206, the metadata management program 112 instructs the file server 4 to remove the snapshot of the previous generation, and ends the processing (Steps S9214 and S9215). In a case of receiving the instruction, the file server 4 removes the specified snapshot.

In this embodiment, the file server 4 does not need to provide a notification of the removal of the file, and hence even a file server 4 not having the function of providing the notification of the removal of the file may move the removed file to the saving storage apparatus 2.

In any embodiment of this invention, the hidden file is removed under the instruction of the metadata server 1. This is to prevent, even when a failure occurs in the file server 4, the metadata server 1, or the network 7 and the file save processing that is being executed is stopped, the hidden file from being removed by the file server 4 before completion of movement of the file to the saving storage apparatus 2 by the metadata server 1.

Moreover, in a case where a failure occurs in the metadata server 1 or the network 7 and the file server 4 cannot notify the metadata server 1 of the removal of the file, the file server 4 detects the failure and delays the notification of the file removal until the communication with the metadata server 1 is resumed.

In the first embodiment, in a case where the file server 4 detects that the communication to/from the metadata server 1 is disabled, the file server 4 may continue the operation by switching to the notification method of the file removal in the second embodiment.

Though the detailed description has been given of this invention referring to the attached drawings, this invention is not limited to this specific configuration, and includes various variations and equivalent configurations within the scope of the accompanying claims.

What is claimed is:

1. A computer system, comprising:
   a file server configured to manage a plurality of files;
   a metadata server configured to manage a plurality of piece of metadata of the plurality of files;
   a business server configured to use the plurality of files to execute predetermined business processing,
   the file server, the metadata server, and the business server being coupled to each other via a network,
   the file server including a first processor, a first memory coupled to the first processor, a first network interface coupled to the first processor, and a first storage medium coupled to the first processor, and configured to store the plurality of files,
   the metadata server including a second processor, a second memory coupled to the second processor, a second network interface coupled to the second processor, and a second storage medium coupled to the second processor,
   the business server including a third processor, a third memory coupled to the third processor, and a third network interface coupled to the third processor,
   the metadata server being coupled to a storage apparatus including a controller and a plurality of storage media, and configured to provide a save area for storing at least one file that is removed from the file server,
   the second storage medium storing a metadata repository for managing at least one of the plurality of piece of metadata of the plurality of files and at least one location of one of the plurality of files stored in the save area,
   the metadata server being configured to:
   store the one of the plurality of files as a saved file in the save area, in a case of detecting that the one of the plurality of files stored in the file server is to be removed by the predetermined business processing executed by the business server; and
   store information indicating a location of the one of the plurality of files in the file server and information indicating the location of the saved file in the save area in association with each other in the metadata repository,
   wherein the computer system further comprises an analysis server configured to execute predetermined analytical processing on the plurality of files,
   wherein the analysis server includes a fourth processor, a fourth memory coupled to the fourth processor, and a fourth network interface coupled to the fourth processor,
   wherein the metadata server identifies a location of a file to be read in response to an inquiry request for the file, and notifies the analysis server of the identified location of the file to be read, in a case of receiving the inquiry request for the plurality of files from the analysis server,
   wherein the analysis server obtains the file to be read from one of the file server and the save area to execute the predetermined analytical processing, based on the notification received from the metadata server,
   wherein the file server includes a first storage space allocated to the file server, the metadata server, the business server, and the analysis server, and a second storage space allocated to the file server, the metadata server, and the analysis server,
   wherein the one of the plurality of files before being removed is stored in the first storage space,
   wherein the file server detects that the one of the plurality of files is to be removed from the file server by the predetermined business processing executed by the business server, and moves the one of the plurality of files from the first storage space to the second storage space, and
   wherein the metadata server is configured to:
   obtain the one of the plurality of files stored in the second storage space and store the obtained one of the plurality of files as the saved file in the save area;
   store, as the information indicating the location of the one of the plurality of files in the file server, information indicating a location of the one of the plurality of files in the first storage space, in the metadata repository; and
   transmit an instruction to remove the one of the plurality of files to the file server, and
   wherein the file server removes the one of the plurality of files from the second storage space, in a case of receiving the instruction to remove.

2. The computer system according to claim 1, wherein the metadata server is configured to:

generate, based on the information stored in the metadata repository, list information including information on locations of the one of the plurality of files stored in the file server and the saved file stored in the save area, in a case of receiving the inquiry request for the plurality of files; and transmit the generated list information to the analysis server.

3. The computer system according to claim 1,
wherein the file server transmits a notification that the one of the plurality of files is to be removed to the metadata server, in a case of detecting that the one of the plurality of files is to be removed from the file server by the predetermined business processing executed by the business server, and wherein the metadata server detects that the one of the plurality of files is to be removed from the file server by receiving the notification from the file server.

4. The computer system according to claim 3, wherein, the file server transmits a notification that at least one of the plurality of files has been removed to the metadata server, one of in a case of detecting that a predetermined number of the plurality of files are to be removed from the file server, and in a case where a predetermined period of time has elapsed since last transmission of the notification that the one of the plurality of files is to be removed.

5. The computer system according to claim 1,
wherein the plurality of files include a plurality of pieces of data,
wherein the file server is configured to:
determine whether removed data is generated, the removed data is data to be removed from the one of the plurality of files by the predetermined business processing executed by the business server; and
move the removed data included in the one of the plurality of files to the second storage space, in a case where it is determined that the removed data is generated, and
wherein the metadata server stores the removed data, which is stored in the second storage space, as the saved file in the save area.

6. The computer system according to claim 5, wherein the metadata server is configured to:
refer to the metadata repository to determine whether there is the removed data corresponding to the file to be read, in a case of receiving the inquiry request for the plurality of files from the analysis server;
read the file to be read stored in the file server, in a case where it is determined that there is the removed data corresponding to the file to be read;
restore the file to be read by obtaining the saved file corresponding to the removed data stored in the save area and overwriting the read file to be read with the removed data obtained from the saved file; and
transmit the restored file to be read to the analysis server.

7. The computer system according to claim 1,
wherein the computer system further comprises a backup storage apparatus including a controller and a plurality of storage media, for storing backup files of the plurality of files stored in the file server, and
wherein the metadata server is configured to:
determine whether the backup storage apparatus stores a backup file having the same content as that of the one of the plurality of files to be removed, in a case of detecting that the one of the plurality of files stored in the file server is to be removed by the predetermined business processing executed by the business server; and store a location of the backup file as the location of the saved file in the metadata repository, in a case where it is determined that the backup storage apparatus stores the backup file having the same content as that of the one of the plurality of files to be removed.

8. The computer system according to claim 1,
wherein the file server has a snapshot generating function for generating a snapshot recording a status of the file server at an arbitrary time point, and
wherein the metadata server is configured to:
transmit, to the file server, an instruction to generate a first snapshot recording a current status of the file server;
refer to the generated first snapshot to update the plurality of piece of metadata stored in the metadata repository;
extract at least one of the plurality of piece of metadata that is not updated from the plurality of piece of metadata to determine whether there is a file corresponding to the extracted at least one of the plurality of piece of metadata in the first snapshot;
obtain a second snapshot that precedes the first snapshot in time series, and obtain the file corresponding to the extracted at least one of the plurality of piece of the metadata from the second snapshot, in a case where it is determined that there is no file corresponding to the extracted at least one piece of the metadata in the first snapshot; and
store the obtained file as the saved file in the save area.

9. A file management method for a computer system,
the computer system including a file server for managing a plurality of files, a metadata server for managing a plurality of piece of metadata of the plurality of files, a business server for using the plurality of files to execute predetermined business processing, and an analysis server for executing predetermined analytical processing on the plurality of files,
the file server, the metadata server, the business server, and the analysis server being coupled to each other via a network,
the file server including a first processor, a first memory coupled to the first processor, a first network interface coupled to the first processor, and a first storage medium coupled to the first processor, for storing the plurality of files,
the metadata server including a second processor, a second memory coupled to the second processor, a second network interface coupled to the second processor, and a second storage medium coupled to the second processor,
the business server including a third processor, a third memory coupled to the third processor, and a third network interface coupled to the third processor,
the analysis server including a fourth processor, a fourth memory coupled to the fourth processor, and a fourth network interface coupled to the fourth processor,
the metadata server being coupled to a storage apparatus including a controller and a plurality of storage media, for providing a save area for storing at least one file that is removed from the file server,
the second storage medium storing a metadata repository for managing at least one of the plurality of piece of metadata of the plurality of files and at least one location of one of the plurality of files stored in the save area,
the file management method comprising:
a first step of storing, by the metadata server, the one of the plurality of files as a saved file in the save area, in a case of detecting that the one of the plurality of files stored in the file server is to be removed by the predetermined business processing executed by the business server;

a second step of storing, by the metadata server, information indicating a location of the one of the plurality of files in the file server and information indicating the location of the saved file in the save area in association with each other in the metadata repository;

a third step of identifying, by the metadata server, a location of a file to be read in response to an inquiry request for the plurality of files, and notifying the analysis server of the identified location of the file to be read, in a case of receiving the inquiry request for the plurality of files from the analysis server; and a fourth step of obtaining, by the analysis server, the file to be read from one of the file server and the save area to execute the predetermined analytical processing, based on the notification received from the metadata server, wherein the file server includes a first storage space allocated to the file server, the metadata server, the business server, and the analysis server, and a second storage space allocated to the file server, the metadata server, and the analysis server, wherein the one of the plurality of files before being removed is stored in the first storage space, wherein the first step further includes:

detecting, by the file server, that the one of the plurality of files is to be removed from the file server by the predetermined business processing executed by the business server, and moving the one of the plurality of files from the first storage space to the second storage space; and obtaining, by the metadata server, the one of the plurality of files stored in the second storage space and storing the obtained one of the plurality of files as the saved file in the save area, and wherein the second step further includes:

storing, by the metadata server, as the information indicating the location of the one of the plurality of files in the file server, information indicating a location of the one of the plurality of files in the first storage space, in the metadata repository;

transmitting, by the metadata server, an instruction to remove the one of the plurality of files to the file server; and removing, by the file server, the one of the plurality of files from the second storage space, in a case of receiving the instruction to remove.

10. The file management method according to claim 9, wherein the third step includes:

generating, by the metadata server, list information including information on locations of the plurality of files stored in the file server and the saved file stored in the save area based on the information stored in the metadata repository; and transmitting, by the metadata server, the generated list information to the analysis server.

11. The file management method according to claim 9, wherein the first step includes detecting that the one of the plurality of files is to be removed from the file server by receiving a notification that the one of the plurality of files is to be removed transmitted from the file server.

12. The file management method according to claim 11, further including transmitting, by the file server, a notification that at least one of the plurality of files has been removed to the metadata server, one of in a case of detecting that a predetermined number of the plurality of files are to be removed from, and in a case where a predetermined period of time has elapsed since last transmission of the notification that the one of the plurality of files is to be removed.

13. The file management method according to claim 9, wherein the plurality of files include a plurality of pieces of data, and wherein the first step includes:

determining, by the file server, whether removed data is generated, being data to be removed from the one of the plurality of files by the predetermined business processing executed by the business server;

moving, by the file server, the removed data included in the one of the plurality of files to the second storage space, in a case where it is determined that the removed data is generated; and storing, by the metadata server, the removed data, which is stored in the second storage space, as the saved file in the save area.

14. The file management method according to claim 13, wherein the third step includes:

referring, by the metadata server, to the metadata repository to determine whether there is the removed data corresponding to the file to be read;

reading, by the metadata server, the file to be read stored in the file server, in a case where it is determined that there is the removed data corresponding to the file to be read;

restoring, by the metadata server, the file to be read by obtaining the saved file corresponding to the removed data stored in the save area and overwriting the read file to be read with the removed data obtained from the saved file; and transmitting, by the metadata server, the restored file to be read to the analysis server.

15. The file management method according to claim 9, wherein the computer system further includes a backup storage apparatus including a controller and a plurality of storage media, for storing backup files of the plurality of files stored in the file server, wherein the first step includes determining, by the metadata server, whether the backup storage apparatus stores a backup file having the same content as that of the one of the plurality of files to be removed, in a case of detecting that the one of the plurality of files stored in the file server is to be removed by the predetermined business processing executed by the business server, and wherein the second step includes storing, by the metadata server, a location of the backup file as the location of the saved file in the metadata repository, in a case where it is determined that the backup storage apparatus stores the backup file having the same content as that of the one of the plurality of files to be removed.

16. The file management method according to claim 9, wherein the file server has a snapshot generating function for generating a snapshot recording a status of the file server at an arbitrary time point, wherein the first step includes:

transmitting, by the metadata server, to the file server, an instruction to generate a first snapshot recording a current status of the file server;

referring, by the metadata server, to the generated first snapshot to update the plurality of piece of metadata stored in the metadata repository; and extracting, by the metadata server, at least one of the plurality of piece of metadata that is not updated from the plurality of piece of metadata to determine whether there is a file corresponding to the extracted at least one of the plurality of piece of metadata in the first snapshot, and wherein the second step includes:

obtaining, by the metadata server, a second snapshot that precedes the first snapshot in time series, and obtaining the file corresponding to the extracted at least one of the plurality of piece of metadata from the second snapshot, in a case where it is determined that there is no file corresponding to the extracted at least one of the plurality of piece of metadata in the first snapshot; and storing, by the metadata server, the obtained file as the saved file in the save area.

17. A metadata server, comprising:

a processor;

a memory coupled to the processor;

a network interface coupled to the processor; and a local storage coupled to the processor, and configured to manage a plurality of piece of metadata of a plurality of files stored in a file server coupled via a network, the metadata server being coupled to an analysis server for executing predetermined analytical processing on the plurality of files, and a saving storage apparatus configured to store at least one file that is removed from the file server, the memory storing a metadata management program for managing the plurality of piece of metadata, a file removal detection program for detecting that the one of the plurality of files is to be removed from the file server, a file save program for moving the one of the plurality of files to be removed from the file server to the saving storage, and an inquiry processing program for processing an inquiry request for the plurality of files from the analysis server, the local storage storing a metadata repository including a metadata management table for managing the plurality of piece of metadata of the plurality of files, and a saved file management table for managing the one of the plurality of files stored in the save area, the processor executing the metadata management program obtaining the plurality of piece of metadata of the plurality of files stored in the file server to update the metadata management table, the processor executing the file removal detection program detecting that the one of the plurality of files stored in the file server is to be removed, the processor executing the file save program copying the one of the plurality of files as a saved file in the saving storage apparatus, the processor executing the file save program storing information indicating a location of the saved file in the saving storage apparatus, in the saved file management table, the processor executing the inquiry processing program identifying, a location of a file to be read in response to the inquiry request for the plurality of files and generating a list including the identified location of the file to be read, in a case of receiving the inquiry request for the plurality of files, the processor executing the inquiry processing program transmitting the generated list to the analysis server, and wherein the file server includes a first storage space allocated to the file server, the metadata server, a business server, and the analysis server, and a second storage space allocated to the file server, the metadata server, and the analysis server, wherein the one of the plurality of files before being removed is stored in the first storage space, wherein the file server is configured to detect that the one of the plurality of files is to be removed from the file server by a predetermined business processing executed by the business server, and move the one of the plurality of files from the first storage space to the second storage space; and wherein the metadata server is configured to:

obtain the one of the plurality of files stored in the second storage space and store the obtained one of the plurality of files as the saved file in the save area, store, as the information indicating the location of the one of the plurality of files in the file server, information indicating a location of the one of the plurality of files in the first storage space, in the metadata repository, and transmit an instruction to remove the one of the plurality of files from the second storage space to the file server, wherein the file server removes the one of the plurality of files from the second storage space, in a case of receiving the instruction to remove.

* * * * *